United States Patent
Yamaguchi

(10) Patent No.: US 8,311,725 B2
(45) Date of Patent: Nov. 13, 2012

(54) ECO-RUN CONTROL DEVICE AND ECO-RUN CONTROL METHOD

(75) Inventor: Kazuhi Yamaguchi, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 400 days.

(21) Appl. No.: 12/792,140

(22) Filed: Jun. 2, 2010

(65) Prior Publication Data
US 2010/0312460 A1    Dec. 9, 2010

(30) Foreign Application Priority Data
Jun. 8, 2009  (JP) .................................. 2009-137473

(51) Int. Cl.
*G06F 19/00* (2011.01)
*F02D 45/00* (2006.01)
(52) U.S. Cl. ...................................................... 701/112
(58) Field of Classification Search .................. 701/112, 701/101, 102, 113, 115; 123/179.3, 179.4
See application file for complete search history.

(56) References Cited

U.S. PATENT DOCUMENTS
6,396,165 B1 * 5/2002 Nagano et al. ............... 307/10.6
7,632,212 B2 * 12/2009 Yamanaka et al. ............ 477/107
7,860,637 B2 * 12/2010 Yamaguchi ................... 701/112

FOREIGN PATENT DOCUMENTS
| JP | A-4-224262 | 8/1992 |
| JP | A-8-61137 | 3/1996 |
| JP | A-11-31067 | 2/1999 |
| JP | A-2002-182737 | 6/2002 |
| JP | A-2004-169588 | 6/2004 |
| JP | A-2005-325794 | 11/2005 |

* cited by examiner

*Primary Examiner* — Hieu T Vo
(74) *Attorney, Agent, or Firm* — Oliff & Berridge, PLC

(57) ABSTRACT

An eco-run control unit performs an eco-run control of stopping an engine mounted on a vehicle automatically on the basis of stop conditions and of restarting the engine automatically on the basis of restart conditions while the engine is stopped automatically by the eco-run control. An acquiring unit acquires information for identifying a vehicle type of the vehicle on which the eco-run control device is mounted. A determining unit determines whether the identified vehicle type is coincident with any of vehicle types stored in a storage unit. A setting unit sets the eco-run control to a specific control depending on one of the vehicle types when the determining unit determines that the identified vehicle type is coincident with the one of the stored vehicle types. The setting unit sets the eco-run control to a default control corresponding to a default vehicle type and permit the eco-run control unit to stop the engine automatically until a determination of the determination unit is completed. The setting unit prohibits the eco-run control unit from stopping the engine automatically when the determining unit determines that the identified vehicle type is different from any of the stored vehicle types.

8 Claims, 14 Drawing Sheets

FIG. 2C

| TYPE INFORMATION | ENGINE TYPE |
|---|---|
| X | A |
| Y | B |
| Z | C |
| W | D |

FIG. 2D

| INTENDED PLACE INFORMATION | INTENDED PLACE |
|---|---|
| L | JAPAN |
| K | EUROPE |
| M | CHINA |
| N | UNITED STATES |

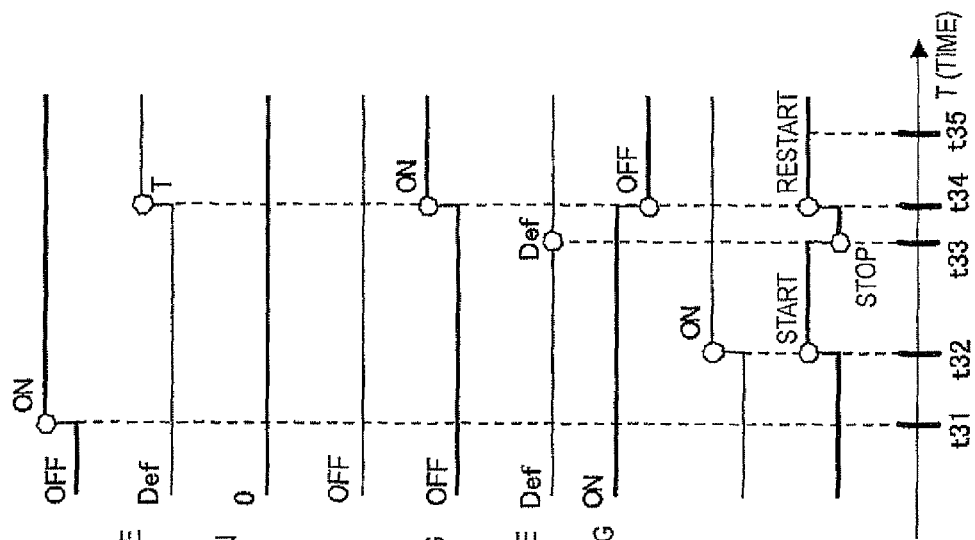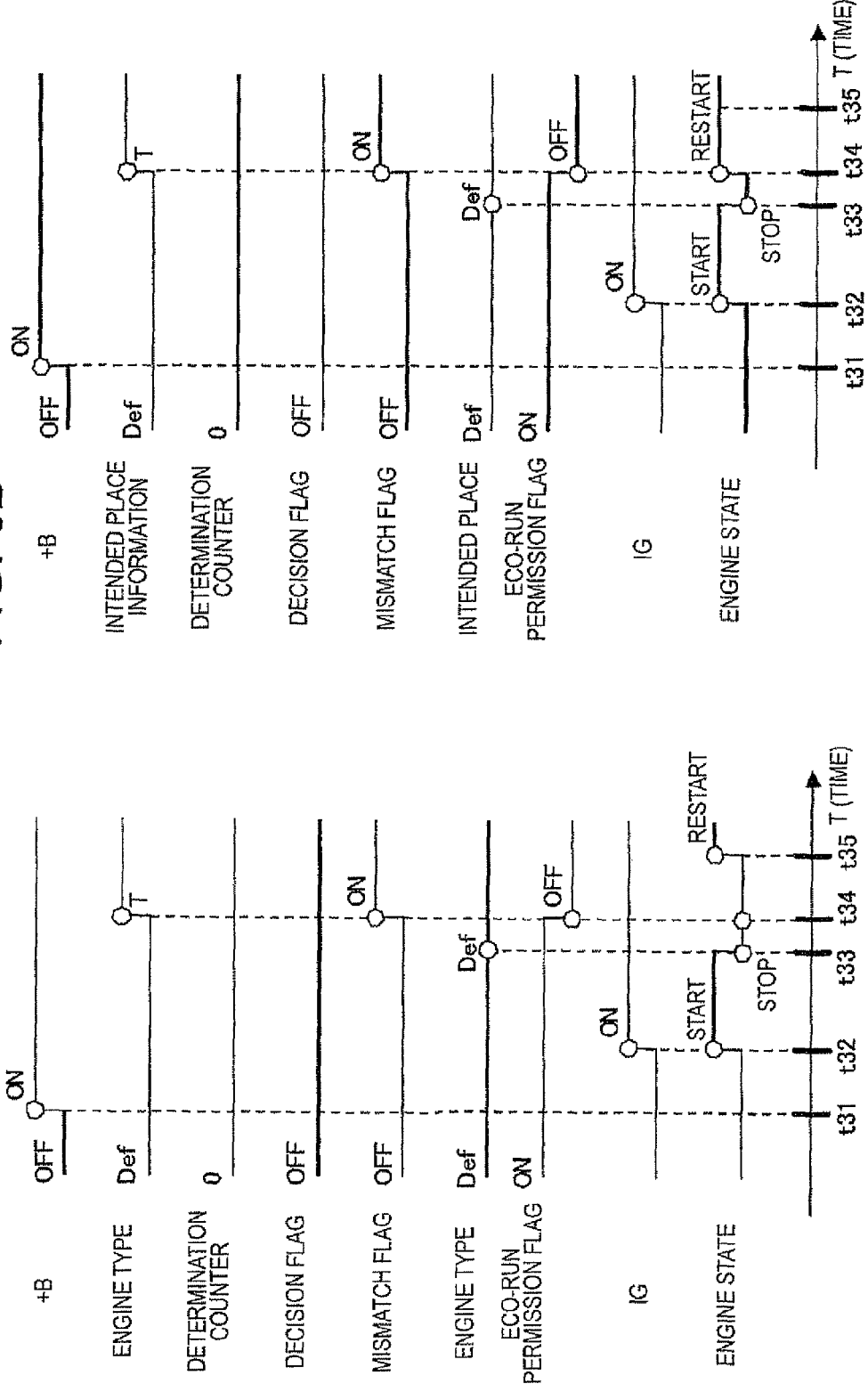

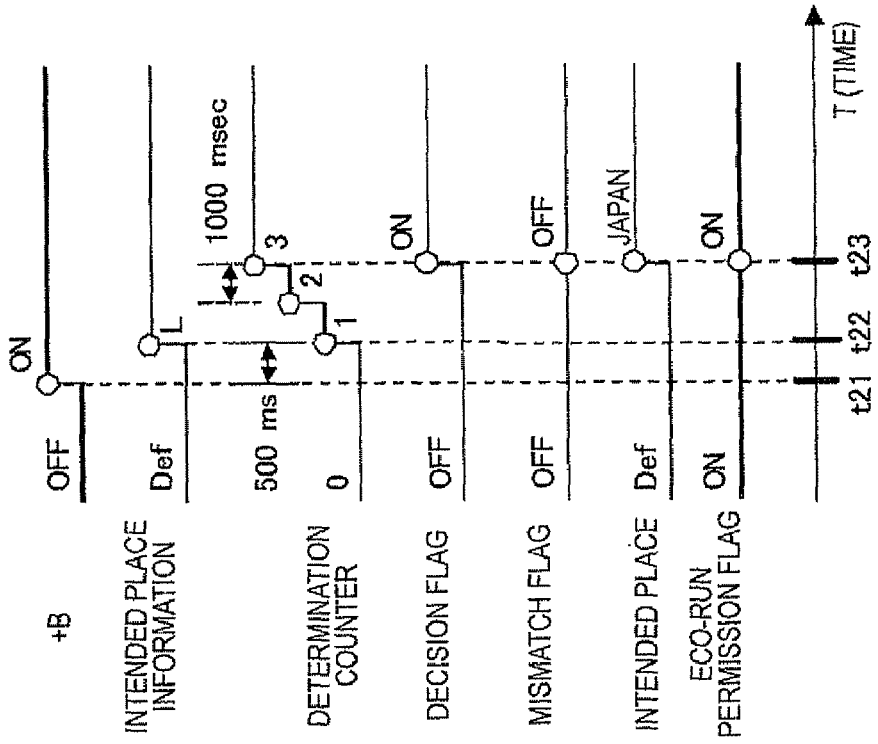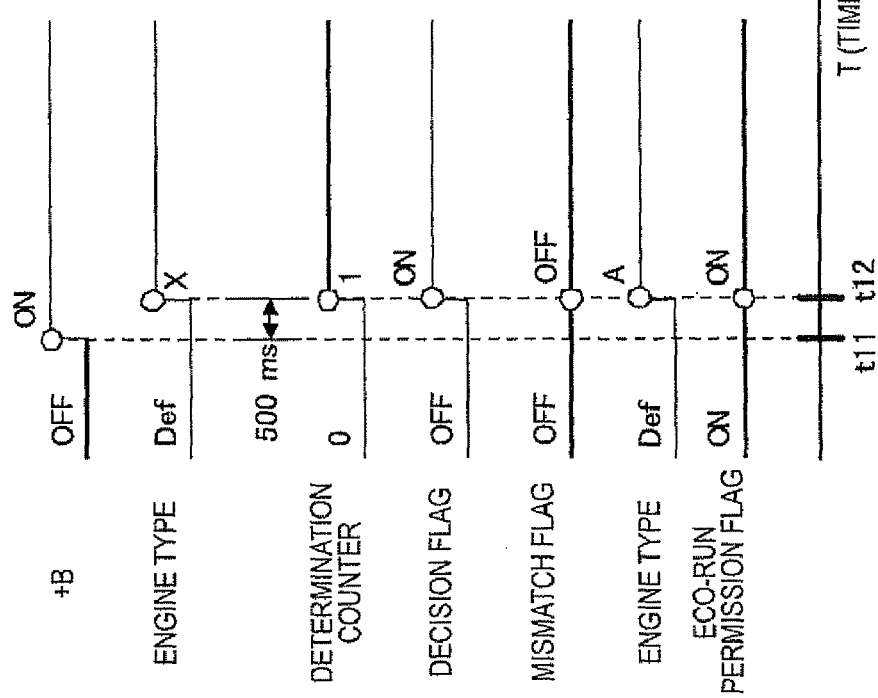

ECO-RUN CONTROL DEVICE AND ECO-RUN CONTROL METHOD

The disclosure of Japanese Patent Application No. 2009-137473 filed on Jun. 8, 2009 including specification, drawings and claims is incorporated herein by reference in its entirety.

BACKGROUND

The present invention relates to an eco-run control device and an eco-run control method for controlling a vehicle to perform eco-run.

In recent years, a vehicle performs eco-driving (hereinafter, also referred to as eco-run) including automatic stopping of the engine (for example, idling stop) in order to improve the gas mileage of the vehicle and to suppress exhaust gas emissions.

In this specification, it is assumed that "eco" means at least one of "economy" and "ecology". Economy means fuel savings (reduction in fuel consumption) by suppressing fuel consumption. Ecology means suppressing fossil fuel consumption or suppressing the generation or emissions of harmful substances or carbon dioxide caused by combustion of fossil fuels.

A vehicle which performs such eco-run includes a detector which detects the state of the vehicle, and a control device which performs control of automatically stopping the engine when it is determined that predetermined stop conditions are satisfied on the basis of the state detected by the detector and which performs control of automatically starting the engine when it is determined that predetermined restart conditions are satisfied on the basis of the state detected by the detector. A specific example of the stop conditions includes a condition in which sufficient electric power to restart the engine is charged in the battery, and a specific example of the restart conditions includes a condition in which the exhaust temperature of the air-conditioner drops so that an increase in the engine water temperature by engine start-up is needed. Here, the amount of the sufficient electric power to restart the engine changes with an engine type of the vehicle, and the exhaust temperature for which the engine water temperature needs to be increased changes with a place where the vehicle is intended to be used or shipped (hereinafter, referred to as an intended place).

Patent Document 1 discloses a control device that detects the type of vehicle in which the engine to be controlled is mounted, and that controls the engine according to the detected type of the vehicle.

This control device includes a memory in which an AT (Automatic Transmission) vehicle control program for controlling an AT vehicle and an MT (Manual Transmission) vehicle control program for controlling an MT vehicle are stored. Moreover, the control device includes a control unit that controls an engine mounted in an AT vehicle according to the AT vehicle control program stored in the memory when a signal unique to the AT vehicle is input and that controls the engine according to the MT vehicle control program in other cases.

Patent Document 1: JP-A-4-224262

However, as the number of types of vehicle which perform eco-run increases, the number of types of control devices to be mounted in various vehicles also increases. This is because the engine stop conditions and the engine restart conditions which are used for determinations of control devices change with the type of vehicle. As a specific example, as shown in FIG. 5B, regarding vehicles which are to be shipped to two places, Japan and Europe, and in which two kinds of engines, diesel and gasoline engines, are mounted, it is necessary to develop, manufacture, and manage four kinds of control devices 500 to 800. For this reason, there has been a problem that the costs required for development, manufacturing, and management of control devices increase as the number of intended places of vehicles and the number of types of engines mounted in the vehicles increase.

Here, the control device disclosed in Patent Document 1 can control a plurality of types of vehicles with one kind of control device. However, if a signal unique to an AT vehicle is not input due to disconnection of wiring lines, for example, the control device executes a control program (i.e. MT vehicle control program) different from the AT vehicle control program even though the control device is mounted in an AT vehicle. Accordingly, there has been a problem that the control device may damage a vehicle or endanger an occupant in the vehicle by execution of a control corresponding to an incorrect vehicle type.

SUMMARY

It is therefore an object of at least one embodiment of the present invention to provide an eco-run control device and an eco-run control method capable of controlling a vehicle to perform eco-run control while ensuring safety of the occupant.

In order to achieve the above described object, according to an aspect of at least one embodiment of the present invention, there is provided an eco-run control device configured to perform an eco-run control of stopping an engine mounted on a vehicle automatically on the basis of stop conditions and of restarting the engine automatically on the basis of restart conditions while the engine is stopped automatically by the eco-run control, the eco-run control device comprising: an eco-run control unit configured to perform the eco-run control; an acquiring unit configured to acquire information for identifying a vehicle type of the vehicle on which the eco-run control device is mounted; a determining unit configured to determine whether the vehicle type identified by the information acquired by the acquiring unit is coincident with any of a plurality of vehicle types stored in a storage unit; and a setting unit configured to set the eco-run control to be performed by the eco-run control unit to a specific control depending on one of the vehicle types when the determining unit determines that the identified vehicle type is coincident with the one of the stored vehicle types, wherein the setting unit sets the eco-run control to be performed by the eco-run control unit to a default control corresponding to a default vehicle type and permit the eco-run control unit to stop the engine automatically until a determination of the determination unit is completed, and wherein the setting unit prohibits the eco-run control unit from stopping the engine automatically when the determining unit determines that the identified vehicle type is different from any of the stored vehicle types.

According to this configuration, the eco-run control is performed according to the default setting until the determination of the vehicle type is completed and stopping of the engine by the eco-run control depending on the vehicle type is prohibited when it is determined that the acquired information identifies a vehicle type different from the vehicle types stored in the storage unit. As a result, it is possible not only to prevent incorrect control based on an incorrect vehicle type but also to perform the eco-run control while ensuring safety of the occupant.

The vehicle type may include a place where the vehicle is intended to be used and the restart conditions vary depending on the place. The acquiring unit may acquire information for identifying the place. The determining unit may determine whether the place identified by the information acquired by the acquiring unit is coincident with any of a plurality of places stored in the storage unit. The setting unit may control the eco-run control unit to restart the engine and then prohibit the eco-run control unit from stopping the engine automatically when the determining unit determines that the identified place is different from any of the stored places during the engine is stopped automatically by the eco-run control.

According to this configuration, if a place different from the places preliminarily stored in the storage unit is acquired while the engine is stopped by the eco-run control, stopping of the engine caused by the eco-run control is prohibited after restarting the stopped engine. As a result, being unable to restart the engine due to restart conditions set on the basis of an incorrect intended place can be prevented.

The vehicle type may include a type of the engine mounted on the vehicle and the stop conditions vary depending on the type of the engine. The acquiring unit may acquire information for identifying the type of the engine. The determining unit may determine whether the type of the engine identified by the information acquired by the acquiring unit is coincident with any of a plurality of types of the engine, stored in the storage unit. The setting unit may prohibit the eco-run control unit to from stopping the engine automatically when the determining unit determines that the identified type of the engine is different from any of the stored types of engine at least one of before the engine is stopped automatically by the eco-run control and after the engine is restarted by the eco-run control.

According to this configuration, if an engine type different from the engine types preliminarily stored in the storage unit is acquired at least one of before the engine is stopped by the eco-run control and after the engine is restarted by the eco-run control, the stopping of the engine caused by the eco-run control is prohibited. As a result, it is possible to prevent erroneous stopping of the engine based on the stop conditions set by an incorrect engine type.

The determining unit may determine whether the identified place is coincident with any of stored places by comparing the identified place with the stored places first multiple times. The determining unit may determine whether the identified type of the engine is coincident with any of the stored types of the engine by comparing the identified type of the engine with the stored types of the engine second multiple times. The first multiple times may be more than the second multiple times.

According to this configuration, the number of times the place where the vehicle is intended to be used (the intended place) is compared with the places preliminarily stored in the storage unit is larger than the number of times the engine type identified by the information acquired by the acquiring unit is compared with the engine types preliminarily stored in the storage unit. Accordingly, it is possible not only to reliably prevent the engine from being unable to restart due to an incorrect intended place but also to prevent the engine from being stopped erroneously due to an incorrect engine type, at an early stage.

According to an aspect of at least one embodiment of the present invention, there is provided an eco-run control method for performing an eco-run control of stopping an engine mounted on a vehicle automatically on the basis of stop conditions and of restarting the engine automatically on the basis of restart conditions while the engine is stopped automatically by the eco-run control, the eco-run control method comprising: performing the eco-run control; acquiring information for identifying a vehicle type of the vehicle on which the eco-run control device is mounted; determining whether the vehicle type identified by the acquired information is coincident with any of a plurality of vehicle types stored in a storage unit; setting the eco-run control to be performed to a default control corresponding to a default vehicle type and permitting to stop the engine automatically in the performing until the determining is completed; setting the eco-run control to be performed to a specific control depending on one of the vehicle types when it is determined that the identified vehicle type is coincident with the one of the stored vehicle types in the determining; and prohibiting stopping the engine automatically in the performing when it is determined that the identified vehicle type is different from any of the stored vehicle types in the determining.

According to this configuration, the eco-run control is performed according to the default setting until the determination of the vehicle type is completed and stopping of the engine by the eco-run control depending on the vehicle type is prohibited when it is determined that the acquired information identifies a vehicle type different from the vehicle types stored in the storage unit. As a result, it is possible not only to prevent incorrect control based on an incorrect vehicle type but also to perform the eco-run control while ensuring safety of the occupant.

According to the eco-run control device and the eco-run control method disclosed in this specification, it is possible to control a vehicle to perform eco-run control while ensuring safety of the occupant.

BRIEF DESCRIPTION OF THE DRAWINGS

The above objects and advantages of the present invention will become more apparent by describing in detail exemplary embodiments thereof with reference to the accompanying drawings, wherein:

FIGS. 2A to 2F are timing charts illustrating examples of signals that the eco-run control device inputs and outputs according to eco-run control at the time of engine driving;

FIGS. 3A to 3D are timing charts illustrating examples of signals that the eco-run control device inputs and outputs according to eco-run control at the time of automatic stopping of the engine;

DETAILED DESCRIPTION OF THE EMBODIMENTS

Hereinafter, exemplary embodiments will be described with reference to the accompanying drawings.

First Embodiment

Figure 1:
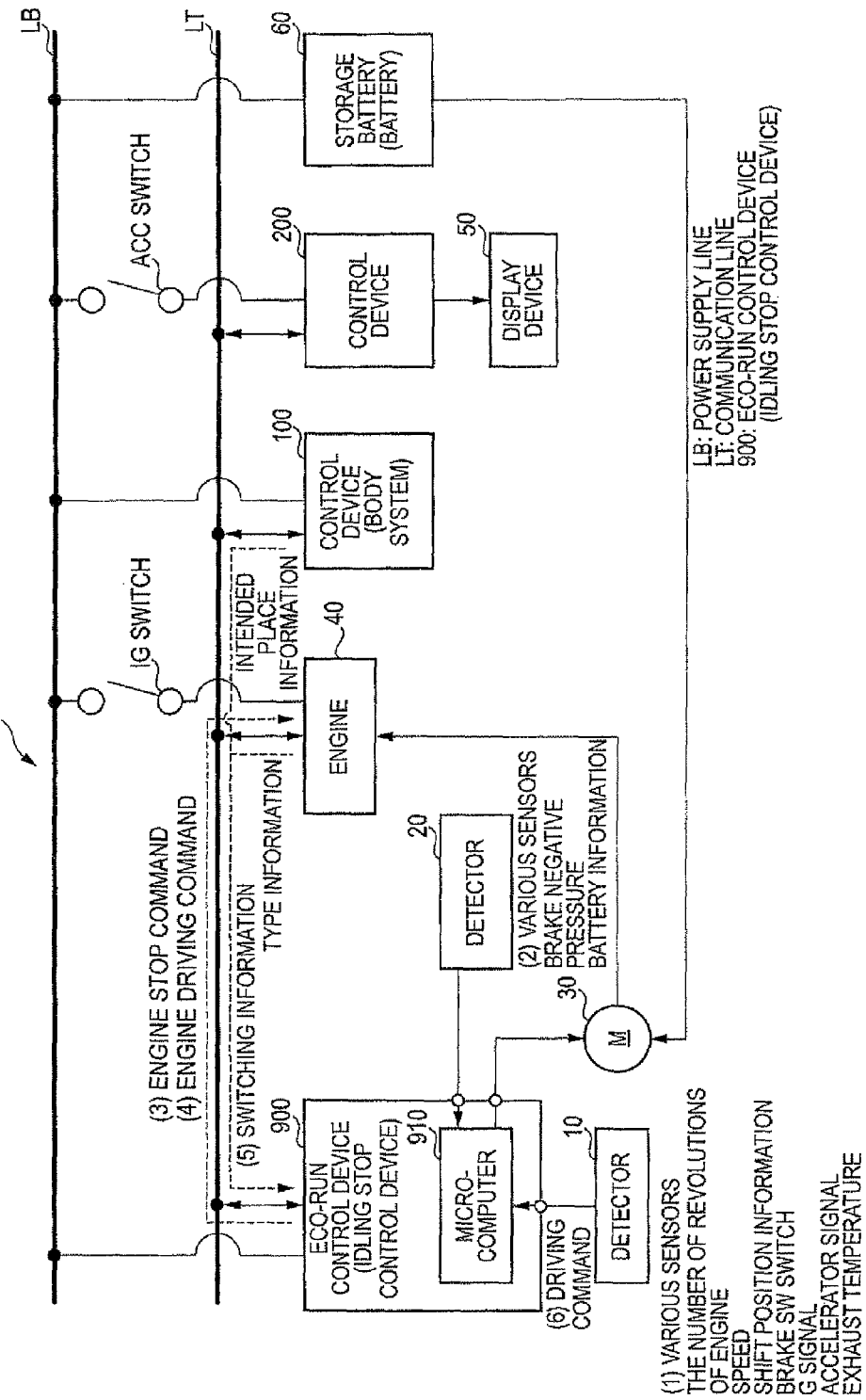
FIG. 1 is a configuration diagram illustrating an eco-run control system including an eco-run control device according to an embodiment of the present invention.

FIG. 1 is a configuration diagram showing an embodiment of an eco-run control system including an eco-run control device of the invention.

An eco-run control system 1 shown in FIG. 1 is mounted in a vehicle. Examples of the vehicle include an automobile, a motorbike, a light vehicle, a trolley bus, a military vehicle, and a railroad vehicle. In addition to the vehicles, the eco-run control system 1 may also be mounted in ships, aircraft, and spacecraft such as a space station. Moreover, in the present embodiment, an explanation will be given assuming that there is a plurality of types of vehicles in which the eco-run control system 1 is mounted. In addition, the type of vehicle changes with a place where the vehicle is intended to be used or shipped (hereinafter, referred to as an intended place) and the type of engine mounted in the vehicle.

The eco-run control system 1 includes detectors 10 and 20, a starter 30, an engine 40, a display device 50, a storage battery 60, control devices 100 and 200, and an eco-run control device 900.

The detector 10 is formed by various kinds of sensors, such as an engine speed sensor, a vehicle speed sensor, a shift position sensor, a brake switch, a G sensor, an accelerator sensor, and a temperature sensor, for example. The detector 10 detects the number of revolutions of the engine 40, the vehicle speed, shift position, whether or not there is a brake operation, acceleration undergone by the vehicle, accelerator opening, and temperatures related to the vehicle (hereinafter, simply referred to as a temperature or the like) and outputs the detected temperature and the like to the eco-run control device 900. In addition, the temperatures related to the vehicle detected by the detector 10 include the water temperature of coolant used to cool the engine 40, the outside air temperature of the vehicle, and the exhaust temperature of a fan provided in an air conditioner (not shown). In addition, the exhaust temperature includes not only the temperature of the outlet of the fan but also the internal temperature within the vehicle around the outlet. The periphery of the outlet refers to a position where the wind blowing from the outlet can be received, for example.

The detector 20 is formed by various kinds of sensors, such as a brake negative pressure sensor and a voltage sensor. The detector 20 detects brake negative pressure and a battery voltage (hereinafter, simply referred to as voltage and the like) and outputs the detected voltage and the like to the eco-run control device 900.

In addition, although the eco-run control system 1 includes two sensors of the detectors 10 and 20 in the present embodiment, the invention is not limited thereto. For example, it is possible to adopt a configuration in which the eco-run control system 1 includes one or three or more sensors which detect the temperature or the like detected by the detectors 10 and 20.

The starter 30 is formed by a starter motor, for example. The starter 30 starts up the engine 40 according to the control of the eco-run control device 900. In addition, the amount of electric power consumed when the starter 30 starts up the engine 40 changes with the type of the engine 40. Specifically, the amount of electric power required for the starter 30 to start up a gasoline engine is different from that required for the starter 30 to start up a diesel engine. Moreover, in both gasoline engines and the diesel engines, if the engine displacements are different, the amount of electric power required for the starter 30 to start up the engine is different.

The engine 40 is, for example, formed by a gasoline engine or a diesel engine. For example, electric power from the storage battery 60 is supplied to the engine 40 through an IG switch (IGnition). The engine 40 transmits the information for identifying the type of the engine 40 to the eco-run control device 900 at fixed periods using the supplied electric power. Although the information for identifying the type of the engine 40 includes the type information indicating the type of the engine 40 (hereinafter, also referred to as the engine type), it is not limited thereto. Then, when an engine driving command instructing the start-up of the engine 40 is received, the engine 40 is started by the starter 30 to start driving. Then, the engine 40 stops when an engine stop command of instructing the stop is received. In addition, the engine 40 which has started the driving generates power for propelling the vehicle by burning fuel according to the control of the eco-run control device 900. Moreover, the engine 40, the temperature of which has risen by combustion, is cooled by coolant. In addition, heat from the engine 40 which is absorbed by coolant is discharged to the outside of the vehicle by an air-conditioner, for example.

The display device 50 is formed by a display panel, for example, and includes various kinds of meters and warning lamps, such as a MIL lamp. The display device 50 is controlled by the control device 200 and displays various kinds of information. Specifically, the display device 50 displays whether or not eco-run is being performed and whether or not the execution of eco-run is prohibited. More specifically, the display device 50 displays whether or not eco-run is being performed and whether or not the execution of eco-run is prohibited by lighting a predetermined lamp. In addition, the invention is not limited to this. For example, it is possible to adopt a configuration in which the eco-run control system 1 includes a sound output device, such as a speaker or a buzzer, and the sound output device outputs a sound set beforehand for each element displayed on the display device 50.

The storage battery 60 is formed by a battery, such as a lead battery, for example. While the engine 40 is being driven, the storage battery 60 stores electric power, which has not been consumed by the control devices 100 and 200 and the eco-run control device 900 (hereinafter, referred to as the control device 100 and the like), of electric power generated by the alternator (that is, a power generator; not shown). In addition, when the engine 40 stops, the storage battery 60 supplies the stored electric power to the control device 100 and the like. Particularly at the start-up of the engine 40, the storage battery 60 supplies the electric power, which is used to start the engine 40, to the starter 30. Here, the amount of electric power used when the starter 30 starts up the engine 40 changes with the type of the engine 40 as described above. For this reason, the storage battery 60 mounted in a vehicle may adopt a different configuration for every type of the engine 40.

The control devices 100 and 200 and the eco-run control device 900 are formed by ECUs (Electronic control units), for example. The control devices 100 and 200 and the eco-run control device 900 are communicably connected to each other through a communication line which is formed by a CAN (Controller Area Network) bus or a LIN (Local Interconnect Network) bus, for example.

The control device 100 is formed by a body-system ECU, for example, and performs body-system control in a vehicle. As a specific example, the control device 100 controls the air-conditioner (not shown). The control device 100 stores the intended place information for identifying the intended place of the vehicle and transmits the stored intended place information to the eco-run control device 900 at fixed periods. This is because the outside temperature of the vehicle, how the vehicle user feels the temperature, the usage of vehicle functions by the user, and the like change with the intended place of the vehicle, and accordingly, the control device 100 mounted in the vehicle changes with the intended place of the vehicle.

The control device 200 is formed by a meter ECU, for example. For example, electric power from the storage battery 60 is supplied to the control device 200 through an ACC switch (ACCessory). In addition, the control device 200 is controlled by the eco-run control device 900, and controls the display device 50 to display the above and following various kinds of information.

The eco-run control device 900 includes a microcomputer 910. The eco-run control device 900 executes software processing using the microcomputer 910. In addition, the software processing executed by the eco-run control device 900 includes eco-run control processing for performing eco-run control. Here, the eco-run control means controlling a vehicle, in which the engine 40 is mounted, to stop the engine on the basis of predetermined engine stop conditions and controlling the vehicle to restart the engine 40 on the basis of predetermined engine restart conditions.

By execution of the eco-run control, the eco-run control device 900 controls the vehicle to perform an idling stop on the basis of the temperature detected by the detectors 10 and 20. Accordingly, especially in the following explanation, the eco-run control device 900 which performs an idling stop is also called the idling stop eco-run control device 900.

Specifically, when the eco-run control device 900 determines that the predetermined engine stop conditions are satisfied on the basis of signals detected by the detectors 10 and 20 connected to the eco-run control device 900, the eco-run control device 900 outputs an engine stop command to the engine 40.

As a specific example of the engine stop conditions, conditions may be mentioned in which a vehicle is in a stopped state and the vehicle is in a state where idling can be stopped. Therefore, the eco-run control device 900 determines whether or not the vehicle has stopped on the basis of one or more signals indicating engine speed, vehicle speed, shift position, existence of a brake operation, acceleration undergone by the vehicle, an accelerator opening, and the like. For example, when it is determined that a sufficient braking force can be maintained even if idling stops and sufficient electric power to restart the engine 40 is stored in the storage battery 60 on the basis of signals indicating brake negative pressure, battery voltage, and the like, the eco-run control device 900 determines that the vehicle is in a state where idling can be stopped. That is, the engine stop conditions include a condition regarding battery capacity and a condition regarding brake negative pressure.

Here, the amount of electric power sufficient to restart the engine 40 and the type of the storage battery 60 which stores electric power change with the type of the engine 40. In addition, the braking force which is sufficient even if idling stops changes with the weight of a vehicle, for example. Moreover, the type of the engine 40 mounted in a vehicle changes with the weight of the vehicle, for example. For this reason, if the type of the engine 40 mounted in the vehicle changes, the condition regarding the battery capacity that the eco-run control device 900 uses and the condition regarding the brake negative pressure should be changed. Accordingly, the eco-run control device 900 uses different engine stop conditions according to the type of the engine 40 mounted in a vehicle.

In addition, when the eco-run control device 900 determines that the predetermined engine restart conditions are satisfied on the basis of signals detected by the detectors 10 and 20 connected to the eco-run control device 900, the eco-run control device 900 drives the starter 30 and outputs an engine driving command to the engine 40.

As a specific example of the engine restart conditions, conditions may be mentioned in which an engine start-up operation by the vehicle driver has been detected or an event to restart the engine has occurred. Therefore, the eco-run control device 900 determines whether or not the driver has the intention to restart the engine 40 on the basis of changes of one or more of the shift position, a brake switch signal (hereinafter, simply referred to as a brake SW signal), and an accelerator signal, for example. In addition, the eco-run control device 900 detects the occurrence of an event, in which the exhaust temperature of the air-conditioner drops or rises so that an increase in the engine water temperature or cooling of a refrigerant by engine start-up is needed, on the basis of the exhaust temperature of the air-conditioner, for example. That is, the engine restart conditions include a condition regarding the temperature.

Here, the temperature change in the vehicle which changes with the exhaust temperature is different according to the outside air temperature of the vehicle. In addition, Europeans and Americans tend to be better able to withstand low temperatures than Asians, including the Japanese. Accordingly, the exhaust temperature at which an increase in the engine water temperature or the cooling of a refrigerant is needed changes with the intended place of the vehicle. For this reason, if the intended place of a vehicle is changed, the conditions regarding the temperature used by the eco-run control device 900 should also be changed. Therefore, the eco-run control device 900 uses different engine restart conditions according to the intended place of a vehicle. In addition, the eco-run control device 900 may be configured to detect the occurrence of an event, in which brake negative pressure decreases so that supply of negative pressure by engine start-up is needed to ensure the braking force of a vehicle, or the occurrence of an event, in which the battery voltage decreases so that charging by engine start-up is needed, on the basis of the brake negative pressure or the battery voltage, for example.

Figure 2A:
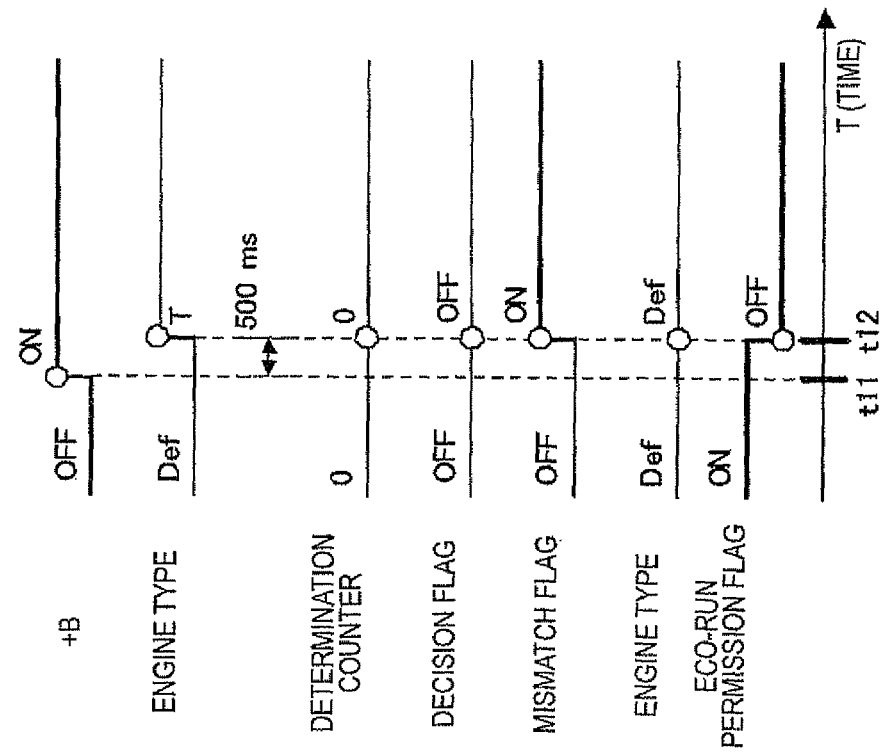

Here, an example of a signal that the eco-run control device 900 inputs and outputs according to the above eco-run control at the time of engine driving will be described with reference to FIGS. 2A to 2F. FIG. 2A is a timing chart showing an example of a signal indicating the type information that the eco-run control device 900 inputs and outputs according to the eco-run control during normal engine driving.

As shown in FIG. 2A, at time t11, a voltage (that is, B+ voltage) is applied from the storage battery 60 to the eco-run control device 900 so that the eco-run control device 900 starts. Then, at time t12 after about 500 milliseconds has elapsed from time t11, the eco-run control device 900 acquires the type information X indicating an engine type A from the engine 40. Then, the eco-run control device 900 determines whether or not the engine type A indicated by the acquired type information is types A to D of controllable engines.

Specifically, as shown in FIG. 2C, the eco-run control device 900 stores the type information X to W indicating the types A to D of controllable engines in a storage unit. Accordingly, the eco-run control device 900 compares the engine type A, which is indicated by the acquired type information, with the stored types A to D of controllable engines in order to determine whether or not they match each other (whether or not they are different). Then, a determination counter which counts the number of times determined to be matched is set to 1.

From time t12 to t13, the eco-run control device 900 repeats the acquisition of type information, the comparison between the acquired type information and the stored information, and the determination on whether or not the compared information items are matched, for example, at predetermined periods of 24 milliseconds. At time t13, since the determination counter exceeds a predetermined value, the eco-run control device 900 decides the type A indicated by the acquired information as the type of the engine 40 and changes the set value of a variable indicating the engine type from the default type Def, which will be described later, to the decided type A.

Figure 2B:
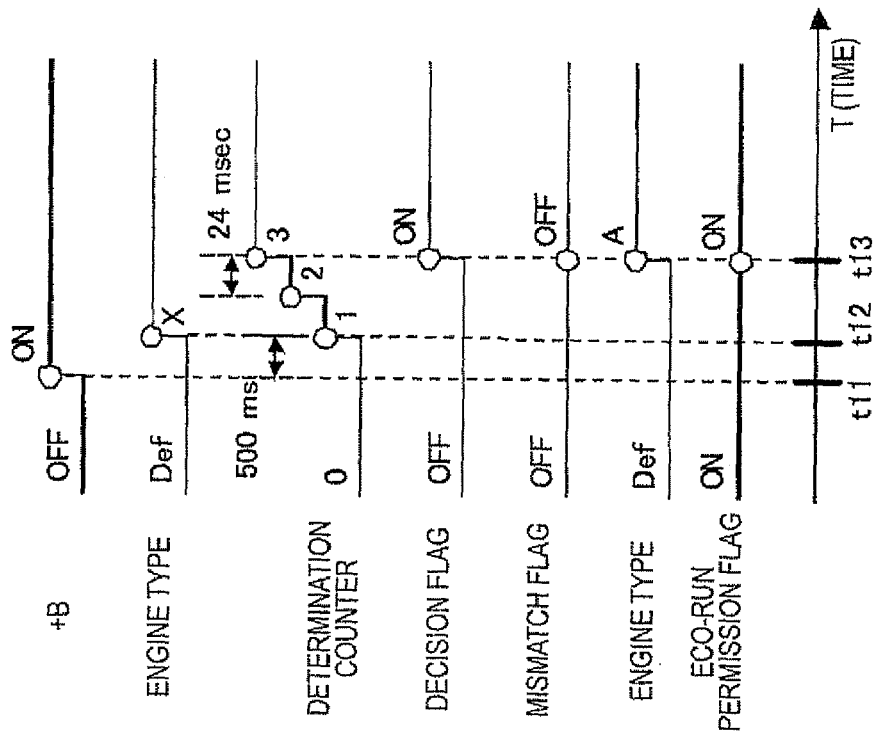

Next, a signal indicating the type information that the eco-run control device 900 inputs and outputs according to the eco-run control when a problem occurs during engine driving will be described with reference to FIG. 2B. In addition, since FIG. 2B shows a change timing of almost the same signal as in FIG. 2A, a different point will be mainly described below. As shown in FIG. 2B, at time t12, the eco-run control device 900 acquires the type information T from the engine 40. The type information T is different from the types of controllable engines stored in the eco-run control device 900. This may occur when the information corruption occurs in the information acquired from the engine 40 due to noise, for example. Then, the eco-run control device 900 determines that the acquired type information T is different from all of the type information X to W of controllable engines stored beforehand. Here, since the engine stop conditions which change with the type of the engine 40 are used in the eco-run control, the eco-run control device 900 prohibits automatic stopping of the engine 40 caused by execution of the eco-run control on the grounds that the type of the engine 40 cannot be specified.

Next, an example of a signal indicating the intended place information that the eco-run control device 900 inputs and outputs according to the eco-run control at the time of engine driving will be described with reference to FIGS. 2D to 2F.

As shown in FIG. 2D, the eco-run control device 900 stores the intended place information L to N indicating the intended places of vehicles which are controllable by the eco-run control device 900.

Figure 2E:
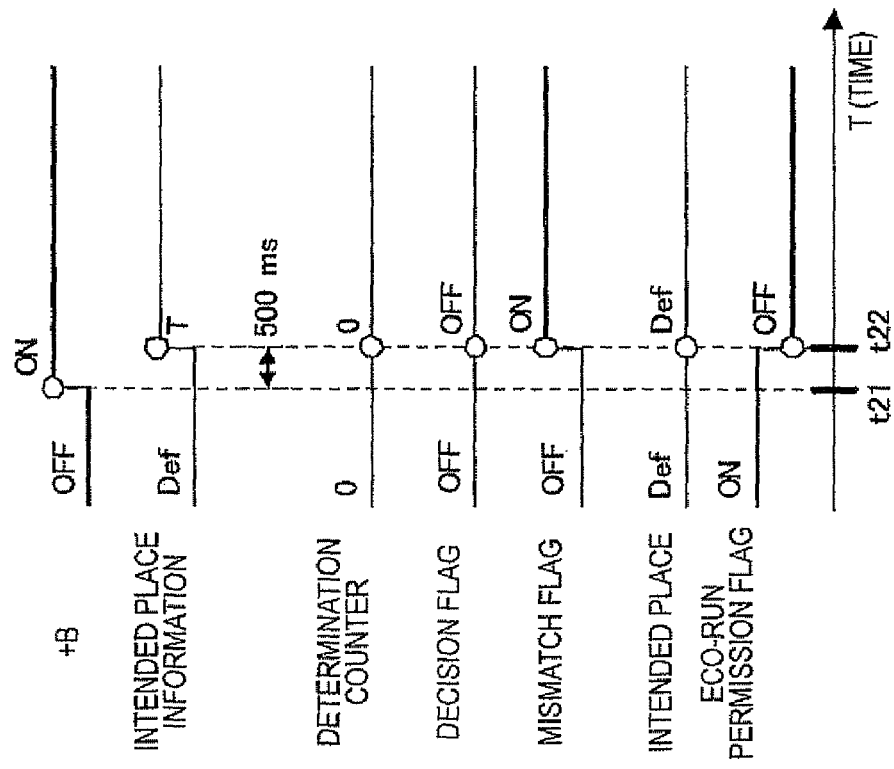

In FIG. 2E, the +B voltage is applied to the eco-run control device 900 at time t21, similar to FIG. 2A. At time t22 after about 500 milliseconds has elapsed from time t21, the eco-run control device 900 acquires the intended place information L, which indicates Japan that is the intended place of the vehicle, from the control device 100. From time t22 to t23, the eco-run control device 900 repeats comparing the acquired intended place information L with the stored information at predetermined periods of 1000 milliseconds, for example. At time t23, since the determination counter exceeds a predetermined value, the eco-run control device 900 decides the intended place indicated by the acquired information as the intended place of the vehicle instead of the default intended place which will be described later.

Next, an example of a signal indicating the intended place information that the eco-run control device 900 inputs and outputs when a problem occurs during engine driving will be described with reference to FIG. 2F. In addition, since FIG. 2F shows a change timing of almost the same signal as in FIG. 2E, a different point will be mainly described below.

Figure 2F:
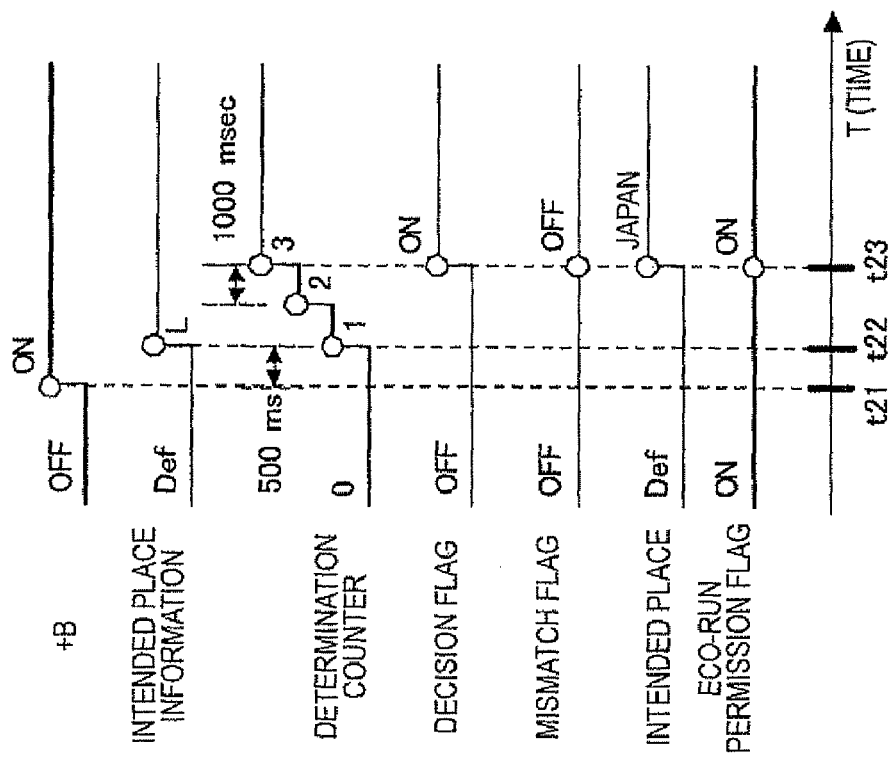

As shown in FIG. 2F, at time t22, the eco-run control device 900 acquires the intended place information T. The intended place information T is different from all intended places of controllable vehicles stored in the eco-run control device 900. As described above, this may also occur when information ghosting occurs due to noise, for example. Here, in the eco-run control, different engine restart conditions are used according to the intended place of a vehicle. For this reason, when the eco-run control device 900 determines that the acquired intended place information T is different from all of the intended place information L to N of controllable vehicles, the eco-run control device 900 prohibits automatic stopping of the engine 40 caused by execution of the eco-run control on the grounds that the intended place of the vehicle cannot be specified.

Next, an example of a signal that the eco-run control device 900 inputs and outputs according to the above eco-run control at the time of automatic stopping of an engine will be described with reference to FIGS. 3A to 3D. FIG. 3A is a timing chart showing an example of a signal indicating the type information that the eco-run control device 900 inputs and outputs according to the eco-run control when a problem occurs in automatic stopping of the engine.

As shown in FIG. 3A, at time t31, the B+ voltage is applied to the eco-run control device 900 so that the eco-run control device 900 starts. Then, at time t32, the eco-run control device 900 acquires a signal indicating that the IG switch has been turned ON and starts the engine 40. Then, since the eco-run control device 900 has not decided the type of the engine 40 yet, the eco-run control device 900 performs eco-run control using the engine stop conditions corresponding to the default type. At time t33, the eco-run control device 900 determines that the engine stop conditions corresponding to the default type are satisfied, and stops the engine 40. At time t34, the eco-run control device 900 acquires the type information T from the engine 40. In the same manner as in FIG. 2B, the eco-run control device 900 determines that the type information T is different from all of the type information of controllable engines stored beforehand.

Here, although the engine stop conditions used in eco-run control are set according to the type of the engine 40, the engine restart conditions are set according to the intended place of the vehicle. For this reason, the eco-run control device 900 continues idling stop even if the type of the engine 40 cannot be specified. Thereafter, at time 35, the eco-run control device 900 determines that the engine restart conditions are satisfied and restarts the engine 40 and then prohibits automatic stopping of the engine 40 caused by eco-run control.

Next, a signal indicating the intended place information that the eco-run control device 900 inputs and outputs according to the eco-run control when a problem occurs in automatic stopping of an engine will be described with reference to FIG. 3B. In addition, since FIG. 3B is almost the same as FIG. 3A, a different point will be mainly described below.

At time t34, the eco-run control device 900 acquires the intended place information T from the engine 40. In the same manner as in FIG. 2F, the eco-run control device 900 determines that the intended place information T is different from all of the intended place information of controllable vehicles stored beforehand.

As described above, the engine restart conditions used in the eco-run control are set according to the intended place of a vehicle. For this reason, the eco-run control device 900 stops idling stop immediately because the intended place of the vehicle cannot be specified. This is to prevent being unable to restart the engine 40 due to using engine restart conditions corresponding to an incorrect intended place. Accordingly, without waiting until time t35, the eco-run control device 900 prohibits automatic stopping of the engine 40 caused by eco-run control after restarting the engine 40.

Figure 4A:
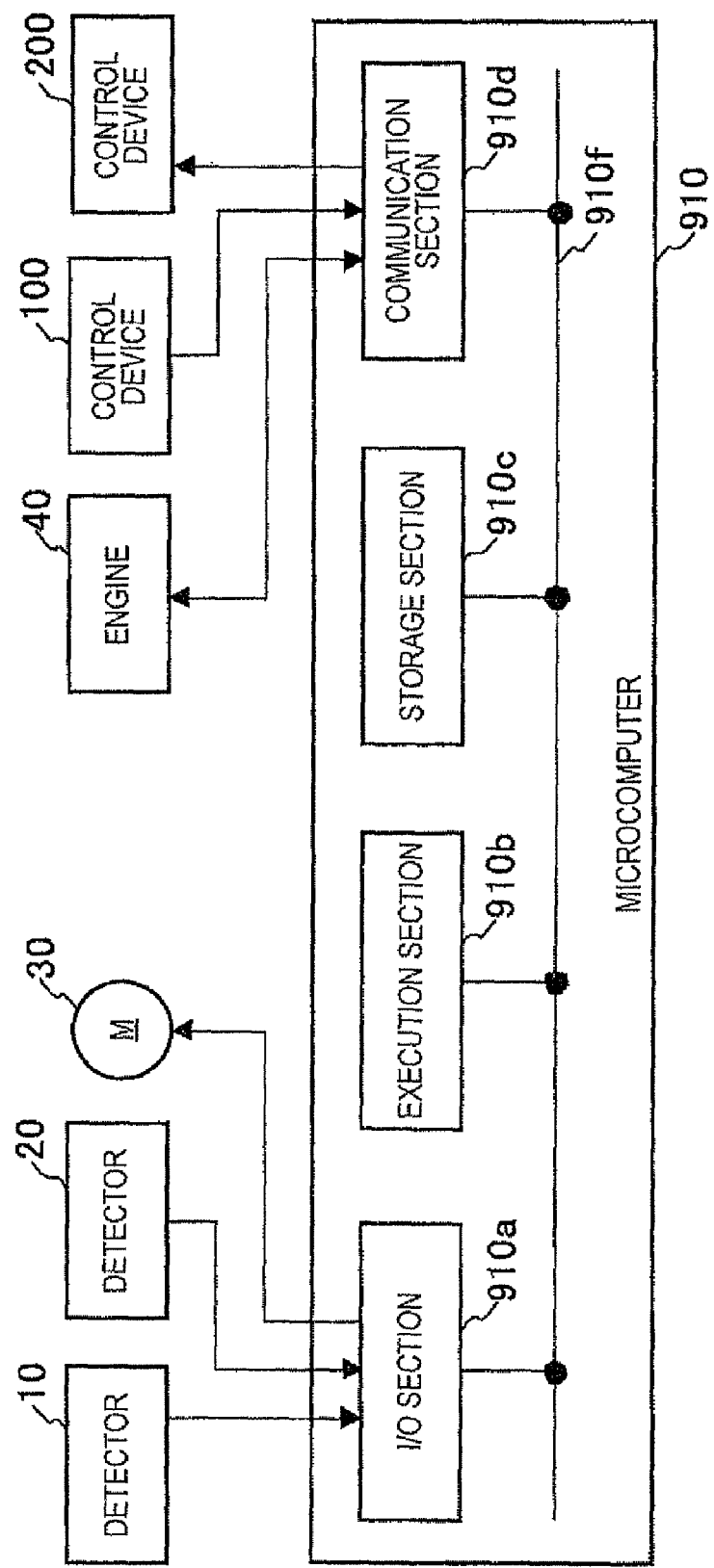
FIGS. 4A to 4C are hardware configuration diagrams illustrating an example of the configuration of a microcomputer according to the embodiment.

Next, the configuration of the microcomputer 910 that the eco-run control device 900 uses in order to execute software processing will be described with reference to FIGS. 4A to 4C. FIG. 4A is a view showing the hardware configuration which is an example of the configuration of the microcomputer 910.

The microcomputer 910 shown in FIG. 4A is configured to include an I/O section 910a (for example, an A/D converter), an execution section 910b (for example, a CPU (Central Processing Unit)), a storage section 910c (for example, a ROM (Read-Only Memory)), and a communication section 910d (for example, a CAN controller). In addition, the I/O section 910a, the execution section 910b, the storage section 910c, and the communication section 910d are connected to each other by a bus 910f so that transmission and reception of information therebetween are possible.

Software processing is realized by making the execution section 910b read a program stored in the storage section 910c and performing the operation according to the execution procedure of software processing indicated by the read program. In addition, the information indicating the result of the operation performed by the execution section 910b is written in the storage section 910c. Moreover, if necessary, the I/O section 910a and the communication section 910d input and output the information, which is input and output or communicated with various sections or devices connected thereto, as information to be operated by the execution section 910b or information indicating the operation result of the execution section 910b.

Next, the configuration of the microcomputer 910 will be described with reference to FIG. 4B focusing on the function. FIG. 4B is a functional block diagram showing an example of the configuration of the microcomputer 910.

The microcomputer 910 includes an acquisition section 911, a determination section 912, a control setting section 913, and a first control section 914.

The acquisition section 911 is realized by executing acquisition processing using the execution section 910b. The acquisition section 911 acquires signals output from the detectors 10 and 20, the engine 40, and the control devices 100 and 200. Specifically, the acquisition section 911 acquires the switching information used for switching of a control program which controls a vehicle. In addition, the switching information includes vehicle type information for identifying the vehicle type of vehicle. The vehicle type information includes intended place information and type information, for example. This is because the vehicle type of vehicle is set by the intended place of the vehicle and the type of the engine 40 mounted in the vehicle.

The determination section 912 is realized by executing determination processing using the execution section 910b. The determination section 912 determines whether or not the vehicle, in which the eco-run control system 1 is mounted, is a controllable vehicle. Specifically, the determination section 912 determines the vehicle type, in which the eco-run control device 900 is mounted, from a plurality of vehicle types stored beforehand in the storage section 910c on the basis of the information acquired by the acquisition section 911. More specifically, the determination section 912 determines whether or not the vehicle type acquired by the acquisition section 911 matches one of the vehicle types of controllable vehicles stored beforehand. Here, since the vehicle type of the vehicle is set by the type of the engine 40 and the intended place of the vehicle, the determination section 912 includes an engine determining section 912a and an intended place determining section 912b as shown in FIG. 4C.

The engine determining section 912a is realized by executing engine determination processing, which is included in the determination processing, using the execution section 910b. The engine determining section 912a determines whether or not the engine 40 is a controllable engine. Specifically, as previously described with reference to FIGS. 2A to 2C, the engine determining section 912a determines whether or not the type of the engine 40 identified by the information acquired by the acquisition section 911 is different from the type of engine which is controllable by eco-run control using the first control section 914. More specifically, the engine determining section 912a determines whether or not the type information acquired by the acquisition section 911 matches the type information, which is stored beforehand in the storage section 910c and is shown in FIG. 2C, a predetermined number of times. As a specific example, the engine determining section 912a decides the type, which is identified by the type information acquired by the acquisition section 911, as a type of the engine 40 when the information items match each other continuously a predetermined number of times.

The intended place determining section 912b is realized by executing intended place determination processing, which is included in the determination processing, using the execution section 910b. The intended place determining section 912b determines whether or not the intended place of the vehicle is an intended place of a controllable vehicle. Specifically, as previously described with reference to FIGS. 2D and 2E, the intended place determining section 912b determines whether or not the intended place identified by the information acquired by the acquisition section 911 is different from the intended place of a vehicle which is controllable by eco-run control using the first control section 914. More specifically, the intended place determining section 912b determines whether or not the intended place information acquired by the acquisition section 911 matches the intended place information, which is stored beforehand in the storage section 910c and is shown in FIG. 2D, a predetermined number of times. As a specific example, the intended place determining section 912b decides the intended place when the information items match each other continuously a predetermined number of times, similar to the engine determining section 912a.

In addition, although the engine determining section 912a and the intended place determining section 912b compare the type information and the intended place information with the information stored beforehand over the same predetermined number of times (that is, 3 times) in FIGS. 2A and 2E, the invention is not limited to these cases. For example, as shown in FIG. 3C, it is possible to adopt a configuration in which the engine determining section 912a compares the type information, which is acquired a smaller number of times (that is, once) than the number of times (that is, 3 times) of comparison of the intended place determining section 912b shown in FIG. 3D, with the stored type information of controllable engines. That is, conversely, it is possible to adopt a configuration in which the intended place determining section 912b compares the acquired intended place information with the stored intended place information of controllable vehicles a larger number of times than the number of times of comparison of the engine determining section 912a.

According to this configuration, the intended place is decided by performing intended place comparison a larger number of times than that of the engine type determination. Conversely, the engine type is decided by comparing engine types, which are acquired a smaller number of times than that in the determination of the intended place, with the types of controllable engines. Accordingly, it is possible not only to prevent an erroneous stop of the engine, which is caused by an incorrect engine type, at an early stage but also to reliably prevent being unable to restart the engine due to an incorrect intended place.

This is because the vehicle or an occupant may be damaged if idling stops on the basis of the engine stop conditions set by an incorrect engine type when a sufficient braking force is not maintained, and accordingly, it is necessary to prevent the erroneous stop at an early stage. Similarly, this is because the engine 40 may not be restarted if idling erroneously stops when sufficient electric power to restart the engine 40 is not stored in the storage battery 60.

In addition, this is because the time until the exhaust temperature of the air-conditioner drops or rises so that an increase in the engine water temperature or cooling of a refrigerant by start-up is needed after idling stop is longer enough than a decision time taken for the intended place determining section 912b to decide the intended place. Similarly, this is because the time until the brake negative pressure decreases so that the supply of negative pressure by engine start-up is needed to ensure the braking force of the vehicle and a time until the battery voltage decreases so that charging by engine start-up is needed are longer enough than a decision time taken for the engine determining section 912a to decide the engine type. This is because a variation in the brake negative pressure and the battery size are different according to the engine type.

Before describing the control setting section 913, the first control section 914 will be described.

The first control section 914 is realized by executing first control processing using the execution section 910b. The first control section 914 executes eco-run control, which is set to be executed by the control setting section 913, selectively among two or more kinds of eco-run control. Here, two or more kinds of eco-run control mean eco-run controls corresponding to two or more vehicle types. Specifically, the eco-run control corresponding to the vehicle type includes eco-run control using the engine stop conditions set according to the type of the engine 40 mounted in the vehicle. In addition the eco-run control corresponding to the vehicle type includes eco-run control using engine restart conditions set according to the intended place of the vehicle.

Figure 5A:
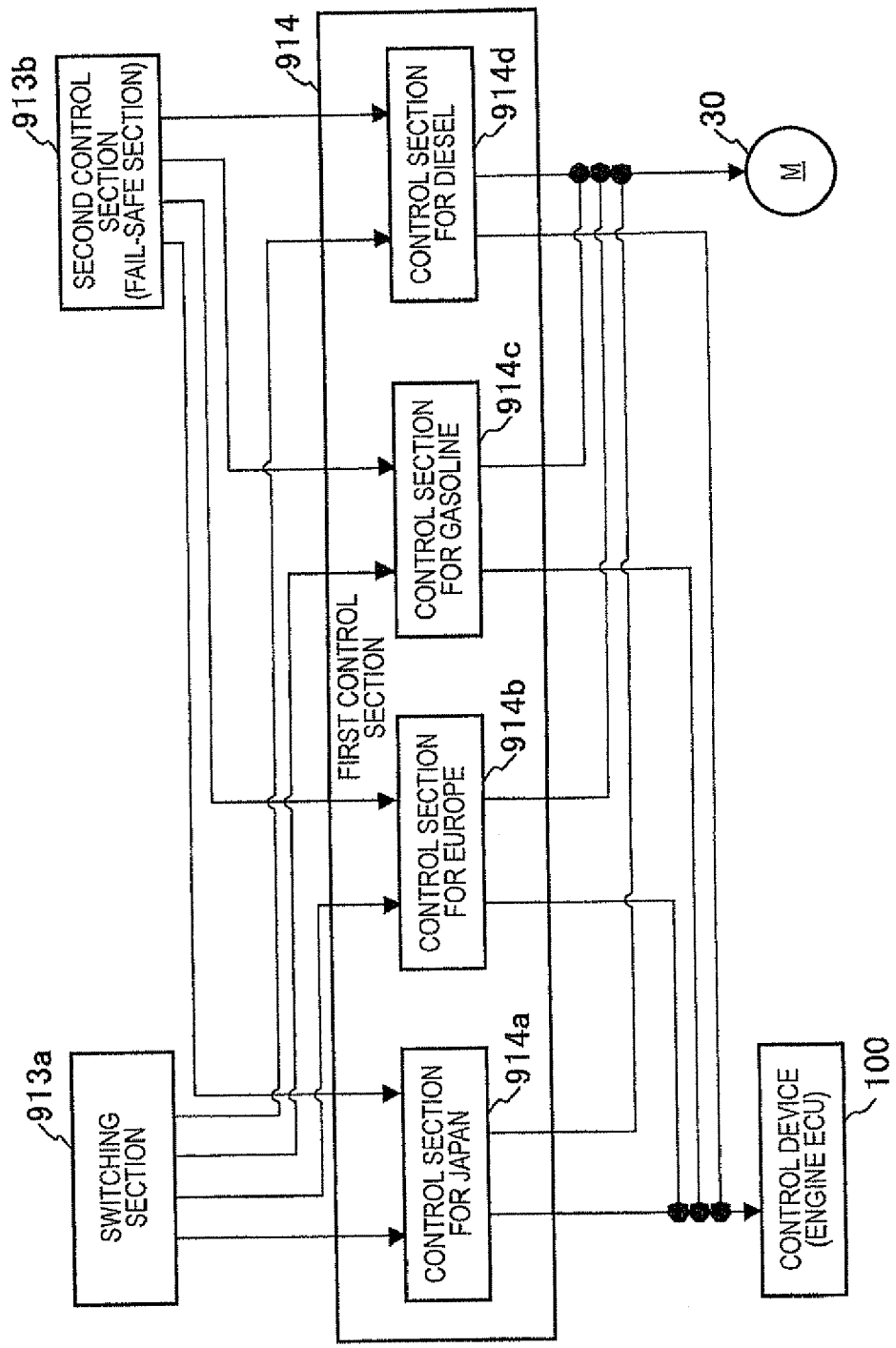
FIGS. 5A and 5B are functional block diagrams illustrating an example of the configuration of a first control section.
Figure 5B:
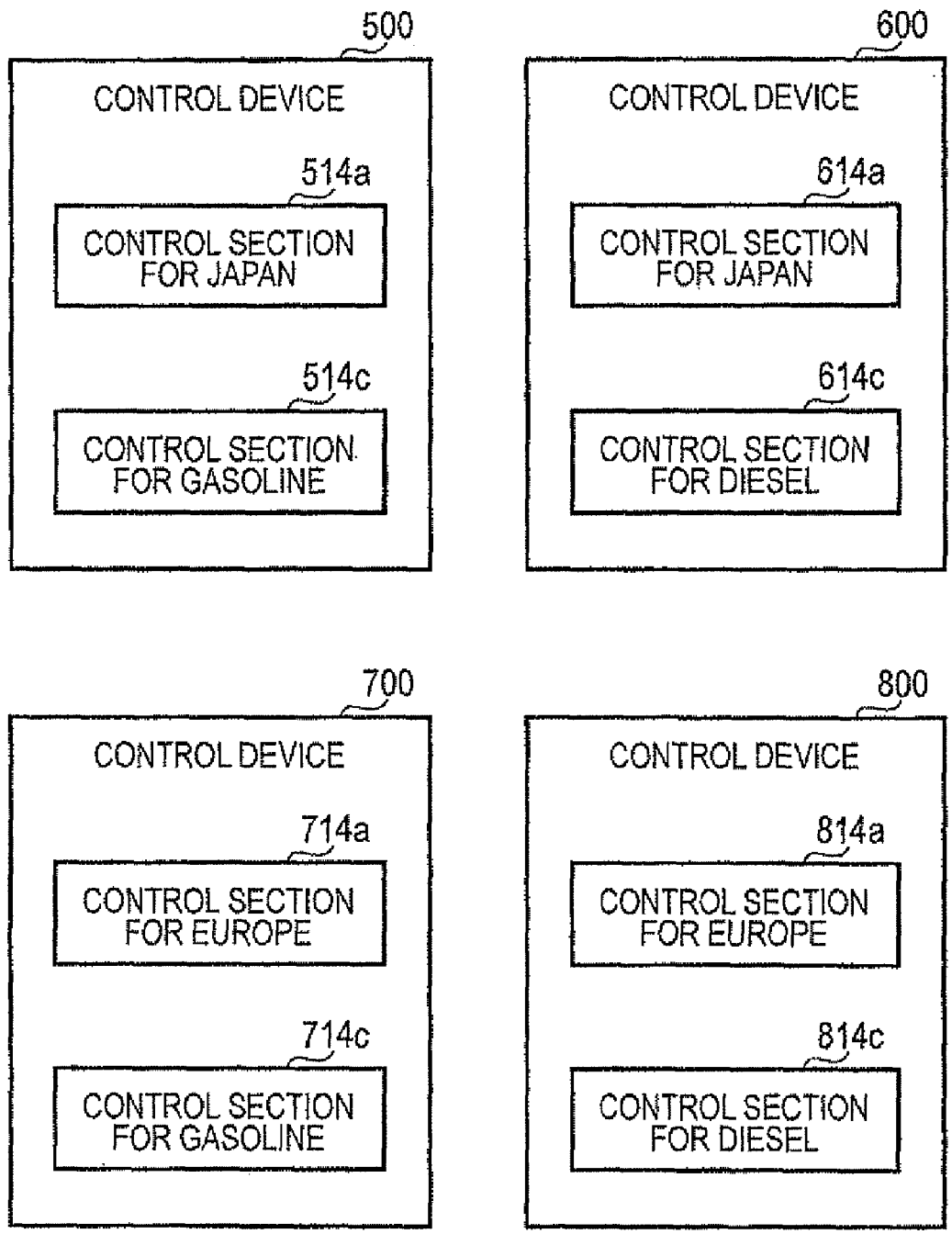

Here, the configuration of the first control section 914 will be described with reference to FIGS. 5A and 5B. FIG. 5A is a functional block diagram showing an example of the configuration of the first control section 914.

The first control section 914 shown in FIG. 5A includes a control section 914a for Japan, a control section 914b for Europe, a control section 914c for gasoline, and a control section 914d for diesel.

The control section 914a for Japan performs eco-run control of a vehicle whose intended place is Japan using engine restart conditions corresponding to Japan. Similarly, the control section 914b for Europe performs eco-run control of a vehicle whose intended place is Europe using engine restart conditions corresponding to Europe.

The control section 914c for gasoline performs eco-run control of a vehicle, in which a gasoline engine is mounted, using the engine stop conditions corresponding to a gasoline engine. Similarly, the control section 914d for diesel performs eco-run control of a vehicle, in which a diesel engine is mounted, using the engine stop conditions corresponding to a diesel engine.

Here, the control section 914a for Japan, the control section 914b for Europe, the control section 914c for gasoline, and the control section 914d for diesel are realized by executing control processing for Japan, control processing for Europe, control processing for gasoline, and control processing for diesel, respectively, using the execution section 910b. Accordingly, the first control section 914 executes processing, which is selected on the basis of the intended place by the control setting section 913, selectively between the control processing for Japan and the control processing for Europe that are stored in the storage section 910c. Similarly, the first control section 914 executes processing, which is selected on the basis of the engine type by the control setting section 913, selectively between the control processing for gasoline and the control processing for diesel that are stored in the storage section 910c.

Next, referring back to FIG. 4B, the explanation regarding the configuration of the microcomputer 910 will be continued.

The control setting section 913 is realized by executing control setting processing using the execution section 910b. The control setting section 913 performs setting on the control, which is executed by the first control section 914, on the basis of a determination result of the determination section 912. Here, the control setting section 913 includes a switching section 913a and a second control section 913b.

The switching section 913a is realized by executing switching processing, which is included in the control setting processing, using the execution section 910b. The switching section 913a switches the eco-run control executed by the first control section 914 to the eco-run control corresponding to the vehicle type identified by the information acquired by the acquisition section 911. Specifically, the switching section 913a sets the eco-run control executed by the first control section 914 to the eco-run control corresponding to the intended place and the engine type identified by the information acquired by the acquisition section 911.

The second control section 913b is realized by executing second control processing using the execution section 910b. The second control section 913b prohibits the first control section 914 from stopping the engine 40 by execution of eco-run control switched by the switching section 913a when the determination section 912 determines that the vehicle type, which is identified by the information acquired by the acquisition section 911, is different from the vehicle type of the vehicle which is controllable by eco-run control using the first control section 914. Specifically, as previously described with reference to FIGS. 2A to 2F and 3A to 3D, the second control section 913b prohibits stopping of the engine 40 caused by execution of eco-run control when the determination section 912 determines that the vehicle type identified by the information acquired by the acquisition section 911 does not match any vehicle type of controllable vehicles stored beforehand in the storage section 910c.

According to this configuration, if a vehicle type different from the vehicle type of vehicle, which is controllable by eco-run control and is stored beforehand, is acquired, the execution of eco-run control set corresponding to the acquired vehicle type is prohibited. As a result, it is possible not only to prevent incorrect control based on an incorrect vehicle type but also to perform eco-run control while better ensuring safety than in the related art.

Next, control that the second control section 913b performs on the first control section 914 while the engine 40 is being driven will be described in detail. In addition, the case where the engine 40 is being driven includes at least either before the engine 40 is stopped by eco-run control or before the engine 40 is stopped again after the engine 40 is restarted.

While the engine 40 is being driven, if it is determined that the acquired vehicle type matches the stored vehicle type, the second control section 913b prohibits the first control section 914 from stopping the engine 40 by execution of eco-run control. Specifically, in the above case, if the engine determining section 912a determines that the type of engine identified by the information acquired by the acquisition section 911 is different from the type of the engine 40 mounted in a vehicle which is controllable by eco-run control using the first control section 914, the second control section 913b prohibits the execution of stopping of the engine 40 caused by eco-run control. More specifically, as previously described with reference to FIGS. 2A to 2C, the second control section 913b prohibits the execution of eco-run control when the determination section 912 determines that the type of engine mounted in a controllable vehicle, which is stored beforehand in the storage section 910c, does not match the type of the engine 40 identified by the information acquired by the acquisition section 911.

According to this configuration, in the above case, the execution of eco-run control is prohibited if a different type from all types of the engine 40 stored beforehand, which is controllable by the eco-run control, is acquired. As a result, it is possible to prevent erroneous stopping of the engine based on stop conditions set on the basis of an incorrect engine type. Specifically, since the execution of eco-run control based on an incorrect engine stop conditions is prevented, it is possible to prevent the engine 40 from being stopped even though the vehicle is in a state where idling of the engine 40 cannot be stopped. In addition, according to this configuration, it is possible to prevent the engine 40 from being stopped when a sufficient braking force cannot be maintained if the engine 40 is stopped. As a result, safety can be better ensured than in the related art. Similarly, it is possible to prevent the engine 40 from being stopped when sufficient electric power to restart the engine 40 is not stored in the storage battery 60.

Next, control that the second control section 913b performs on the first control section 914 when the engine 40 stops automatically will be described in detail. In addition, the case where the engine 40 stops automatically includes the case where the engine 40 is stopped by eco-run control.

When the engine 40 stops automatically by eco-run control, the second control section 915 controls the first control section 914 to restart the engine 40 and then prohibits the first control section 914 from executing the eco-run control.

Figure 4B:
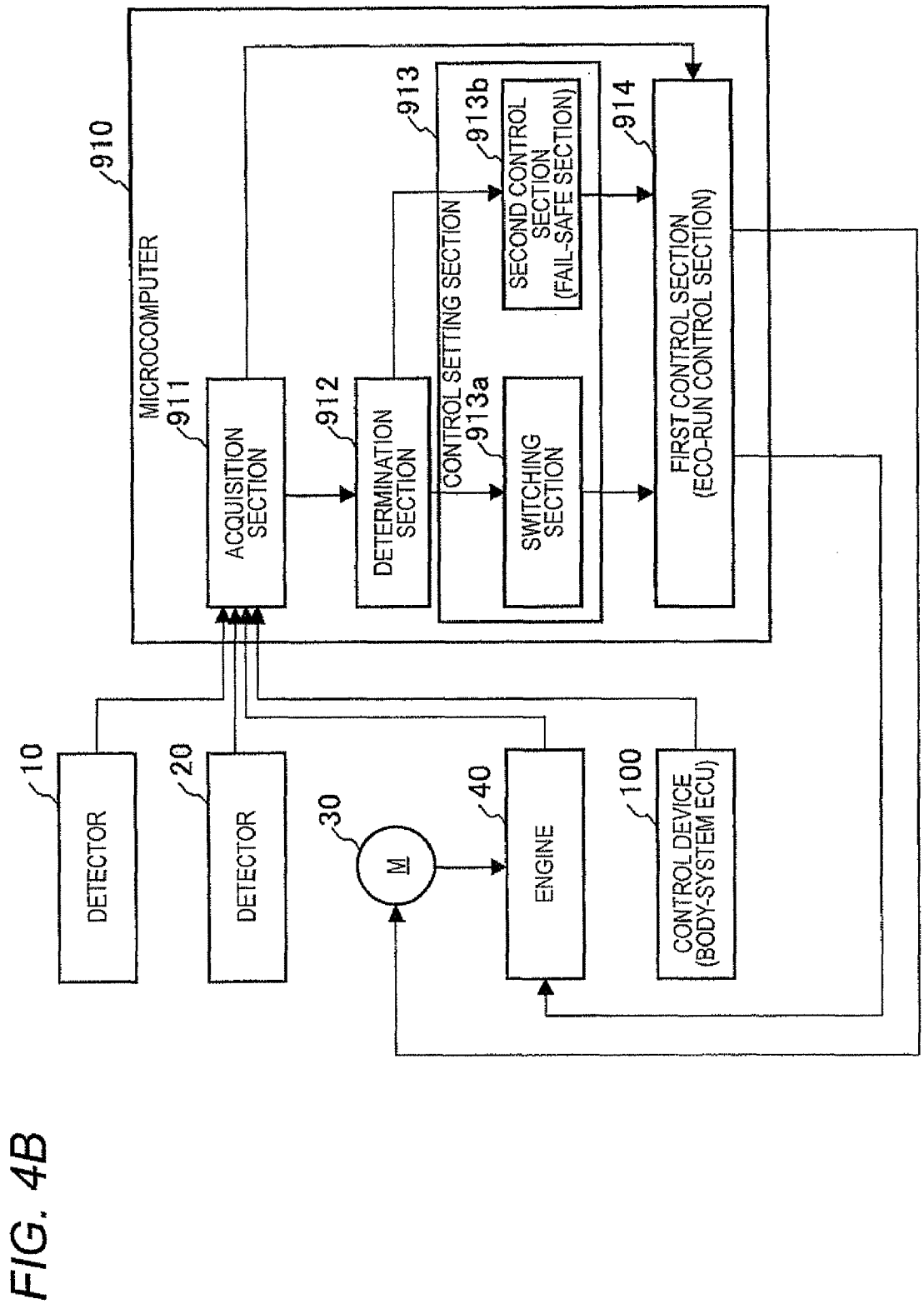
Figure 4C:
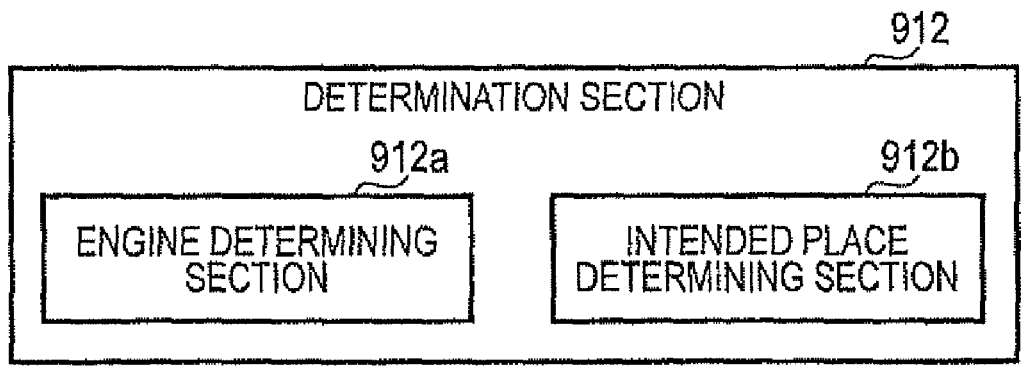

As a specific example, the case described in FIGS. 4A and 4B will be mentioned again. FIG. 4A shows the case where the intended place determining section 912b determines that the type of the engine 40 identified by the information acquired by the acquisition section 911 is different from the type of engine controllable by eco-run control using the first control section 914 when the engine 40 stops automatically. In this case, the second control section 913b waits until the restart conditions are satisfied to restart the engine 40 and then prohibits the eco-run control. This is because the engine restart conditions are set by the intended place of the vehicle.

On the other hand, FIG. 4B shows the case where the intended place determining section 912b determines that the intended place identified by the information acquired by the acquisition section 911 is different from the intended place of a vehicle controllable by eco-run control using the first control section 914 when the engine 40 stops automatically. In this case, the second control section 913b restarts the engine 40 without waiting until the restart conditions are satisfied and then prohibits the eco-run control. This is to prevent being unable to restart the engine 40 due to using engine restart conditions corresponding to an incorrect intended place.

That is, according to this configuration, if an intended place different from the intended place of a vehicle controllable by eco-run control is acquired in the above case, the second control section 913b restarts the engine 40 stopped by the eco-run control and then prohibits the execution of eco-run control. As a result, being unable to restart the engine 40 due to restart conditions set on the basis of an incorrect intended place can be prevented. Specifically, if it is determined that the intended places do not match each other, the engine 40 is restarted regardless of whether or not the engine restart condition are satisfied. As a result, being unable to restart the engine 40 due to incorrect restart conditions can be prevented. In addition, according to this configuration, it is possible to prevent the occurrence of a situation where the engine 40 does not start up even after the vehicle driver has performed an operation for start-up of the engine, for example. Similarly, it is possible to prevent the occurrence of a situation where the engine 40 does not start up even though an event to restart the engine has occurred, for example. More specifically, it is possible to prevent the occurrence of a situation where the engine 40 does not start up even though an event has occurred in which the exhaust temperature of the air-conditioner drops or rises so that an increase in the engine water temperature or cooling of a refrigerant by engine start-up is needed, for example. As a result, according to this configuration, it is possible to reliably prevent the exhaust temperature of the air-conditioner from dropping or rising so that a vehicle or an occupant may be damaged.

In addition, before the determination section 912 decides the type of vehicle, the second control section 913b controls the first control section 914 to perform eco-run control on the basis of the engine stop conditions and the engine restart conditions set on the basis of the default vehicle type. In addition, the default vehicle type is set by a default engine type and a default intended place.

Here, the default vehicle type, the default engine type, and the default intended place refer to the initial values set beforehand to indicate a vehicle type, engine type, and an intended place, respectively. These initial values refer to fail-safe values which cause no problems for the eco-run control. Specifically, these initial values refer to the values at which a vehicle or an occupant of the vehicle is not damaged compared with the related art even when the first control section 914 executes eco-run control on the basis of the initial values. As a specific example of the initial value of an engine type, an initial value indicating an engine type in which the eco-run conditions are most difficult to satisfy may be mentioned. In addition, as an example of the engine type in which the eco-run conditions are most difficult to satisfy, a type of engine which requires the largest amount of electric power for start-up, among engines which can be mounted in a vehicle, may be mentioned. In addition, as a specific example of the initial value of an intended place, an initial value indicating an intended place in which the engine start conditions are satisfied most easily may be mentioned. In addition, as an example of the intended place in which the engine start conditions are satisfied most easily, the coldest or hottest place among places where vehicles can be sold may be mentioned. In addition, as another specific example of the initial value of the intended place, an initial value indicating the place where people most sensitive to the cold or the heat use vehicles may be mentioned.

In addition, when the second control section 913b has prohibited the execution of eco-run control, the second control section 913b controls the control device 200 to make the display device 50 display that the eco-run has been prohibited. According to this configuration, it is possible to display that the eco-run has been prohibited.

Figure 6:
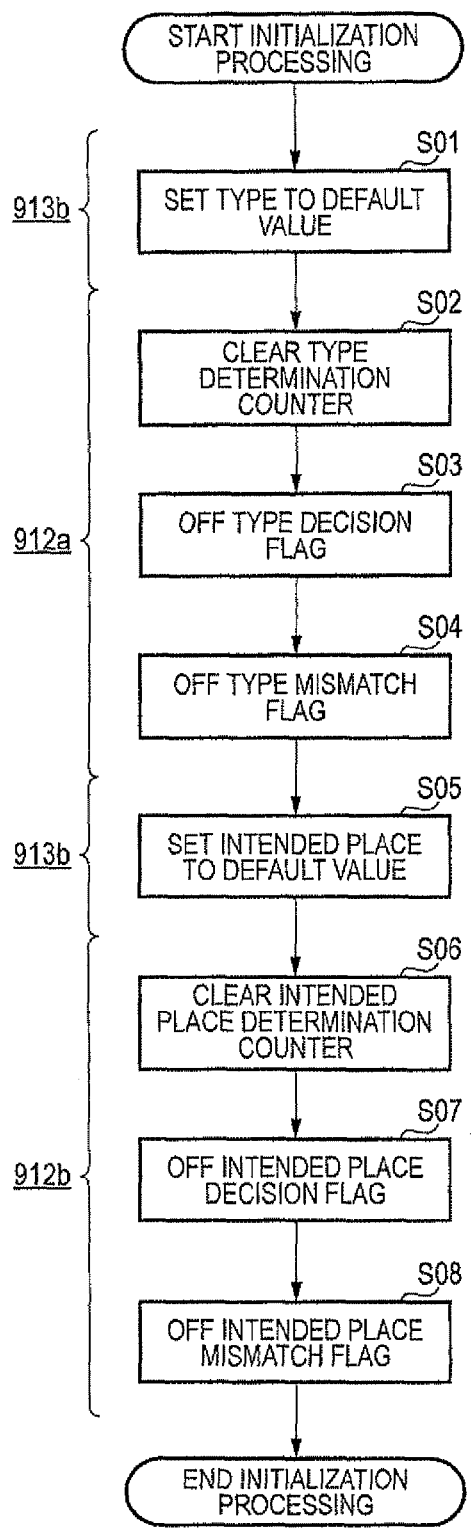
FIG. 6 is a flow chart illustrating an example of initialization processing executed by the eco-run control device according to the embodiment.

Next, initialization processing executed at the start of the eco-run control device 900 will be described with reference to FIG. 6. FIG. 6 is a flow chart showing an example of initialization processing executed by the eco-run control device 900. In addition, the eco-run control device 900 starts to run when the +B power supply is connected thereto.

First, the eco-run control device 900 sets the engine type to the default value (step S01). Then, the eco-run control device 900 initializes the determination counter, which is used to determine the engine type, by assigning the value "0", for example (step S02). Then, the eco-run control device 900 initializes a decision flag, which indicates that the engine type has been decided, as a value "OFF", for example (step S03). Then, the eco-run control device 900 initializes a mismatch flag, which indicates that the engine type does not match any type stored beforehand, as a value "OFF", for example (step S04).

Then, the eco-run control device 900 executes processing, which is equivalent to the processing in steps S01 to S04, for the intended place (steps S05 to S08). Then, the eco-run control device 900 ends the execution of initialization processing.

In FIG. 6, steps S01 and S05 are equivalent to an example of the second control processing for realizing the second control section 913*b*. In addition, steps S02 to S04 are equivalent to an example of the engine determination processing for realizing the engine determining section 912*a*, and steps S06 to S08 are equivalent to an example of the intended place determination processing for realizing the intended place determining section 912*b*.

Figure 7:
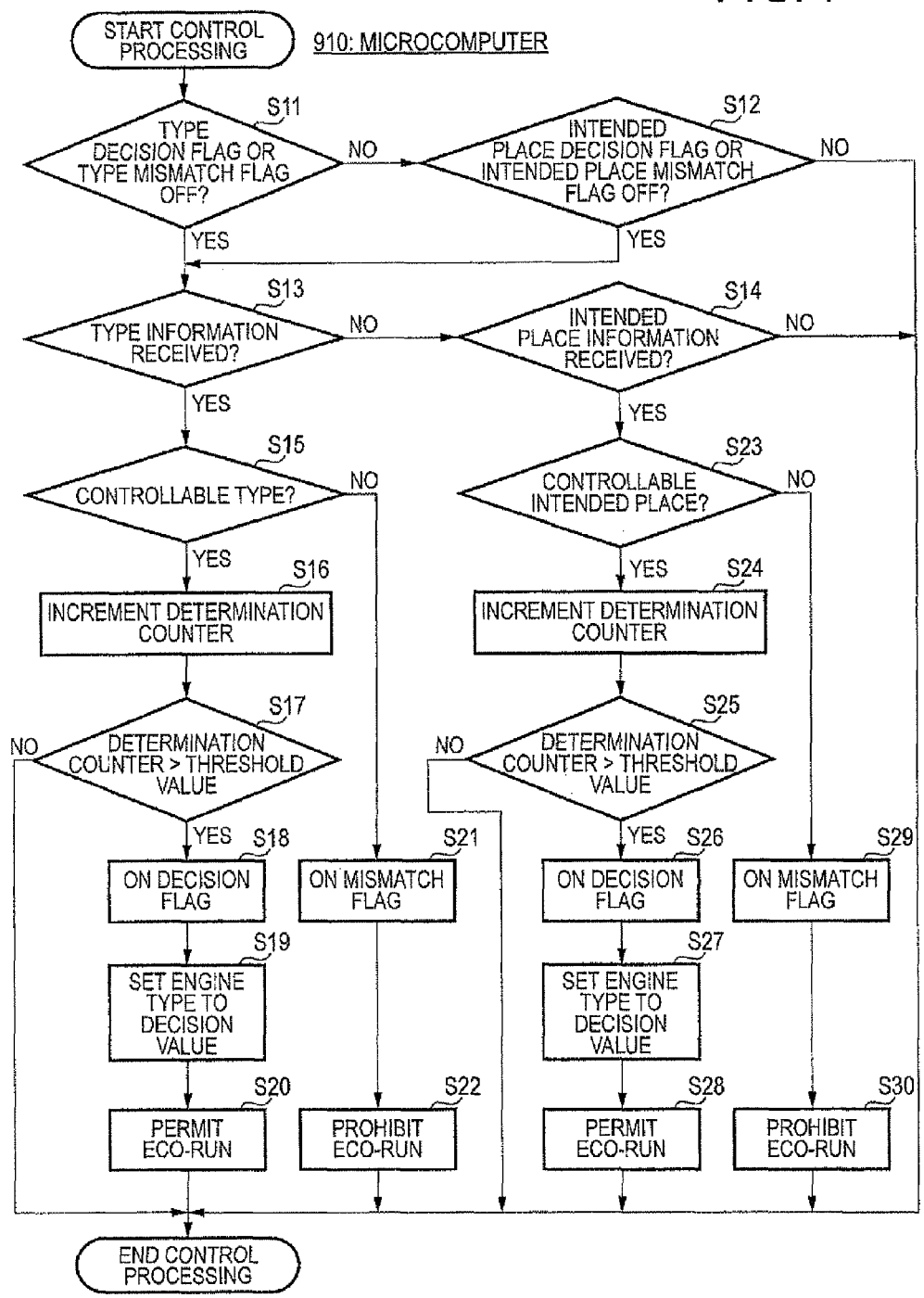
FIG. 7 is a flow chart illustrating an example of control processing executed by the eco-run control device according to the embodiment.

Next, control processing that the eco-run control device 900 executes to control a vehicle will be described with reference to FIG. 7. FIG. 7 is a flow chart showing an example of control processing executed by the eco-run control device 900. In addition, the eco-run control device 900 executes the control processing at predetermined periods shorter than a period at which a signal is received from the detector 10 or the like. Moreover, although the period at which the eco-run control device 900 receives a signal was described as 24 milliseconds, for example, it is not limited thereto.

First, the eco-run control device 900 determines whether or not the value of a decision flag or a mismatch flag of an engine type is an initial value (that is, value "OFF") (step S11). When it is determined that the value of the decision flag or the mismatch flag of the engine type is an initial value, the eco-run control device 900 executes processing in step S13. In other cases, the eco-run control device 900 executes processing in step S12.

When it is determined that the values of both the decision flag and the mismatch flag of the engine type are not initial values in step S11, the eco-run control device 900 determines whether or not the value of a decision flag or a mismatch flag of the intended place is an initial value (step S12). When it is determined that the value of the decision flag or the mismatch flag of the intended place is an initial value, the eco-run control device 900 executes the processing in step S13. In other cases, the eco-run control device 900 ends the execution of control processing.

When it is determined that the value of either the decision flag or the mismatch flag of the engine type is an initial value in step S11 or the value of either the decision flag or the mismatch flag of the intended place is an initial value in step S12, the eco-run control device 900 determines whether or not the type information has been received (step S13). When it is determined that the type information has been received, the eco-run control device 900 executes processing in step S15. In other cases, the eco-run control device 900 executes processing in step S14.

When it is determined that the type information has been received in step S13, the eco-run control device 900 determines whether or not the intended place information has been received (step S14). When it is determined that the intended place information has been received, the eco-run control device 900 executes processing in step S23. In other cases, the eco-run control device 900 ends the control processing.

When it is determined that the type information has been received in step S13, the eco-run control device 900 determines whether or not the received type matches the type of a controllable engine (step S15). When it is determined that the received type matches the type of a controllable engine, the eco-run control device 900 executes processing in step S16. In other cases, the eco-run control device 900 executes processing in step S21.

When it is determined that the received type matches the type of a controllable engine in step S15, the eco-run control device 900 increments the engine type determination counter in order to count the number of times matched (step S16). Then, the eco-run control device 900 determines whether or not the engine type determination counter has exceeded a threshold value (step S17). When it is determined that the engine type determination counter has exceeded the threshold value, the eco-run control device 900 executes processing in step S18. In other cases, the eco-run control device 900 ends the execution of control processing.

When it is determined that the engine type determination counter has exceeded the threshold value in step S17, the eco-run control device 900 decides the type, which is identified by the acquired information, as the type of the engine 40 and sets the value of a decision flag of the engine type to "ON" (step S18). Then, the eco-run control device 900 sets the engine type to the decided value (step S19). Then, the eco-run control device 900 permits the execution of eco-run (step S20). Then, the eco-run control device 900 ends the execution of control processing.

In addition, the eco-run control device 900 executes eco-run control processing in parallel using the engine stop conditions set on the basis of the decided engine type.

When it is determined that the received type does not match the type of a controllable engine in step S15, the eco-run control device 900 set a mismatch flag of the engine type to "ON" (step S21). Then, the eco-run control device 900 prohibits the execution of eco-run (step S22). Then, the eco-run control device 900 ends the execution of control processing.

When it is determined that the intended place information has been received in step S14, the eco-run control device 900 executes processing, which is equivalent to the processing in steps S15 to S22, for the intended place (steps S23 to S30). Then, the eco-run control device 900 ends the execution of control processing.

In FIG. 7, steps S15 to S19 and S21 are equivalent to an example of the engine determination processing for realizing the engine determining section 912*a*. In addition, steps S23 to S27 and S29 are equivalent to an example of the intended place determination processing for realizing the intended place determining section 912*b*. In addition, steps S20, S22, S28, and S30 are equivalent to an example of the second control processing for realizing the second control section 913*b*.

Moreover, in the present embodiment, the eco-run control device 900 may be configured such that a determination is not performed again after it is determined that the acquired type or intended place does not match any type or intended place stored beforehand. According to this configuration, an incorrect control performed on the basis of an incorrect engine type can be reliably prevented.

Moreover, the invention is not limited to this, but the eco-run control device 900 may also be configured to perform a determination again after it is determined that the acquired type does not match any type stored beforehand. In addition, in this configuration, it is possible to decide the type or the intended place on the basis of a result of the determination performed again and to execute eco-run control corresponding to the decided type or intended place. Specifically, the eco-run control device 900 may be configured to initialize a mismatch flag by executing the initialization processing described in FIG. 6 again when the IG switch changes from "ON" to "OFF". According to this configuration, the type or the intended place can be reliably specified since the influence of noise is reduced, for example.

Some or all of the functions realized by executing software processing by the eco-run control device 900 may be realized using a hardware circuit. In addition, a program in which the procedure of processing executed by the eco-run control device 900 is described may be provided by distribution in a state where the program is stored in a magnetic disk or an optical disk, a semiconductor memory, and other recording media or by distribution through a network. In addition, a control method of the invention may be executed using the eco-run control device 900.

Second Embodiment

The eco-run control system 1 in the second embodiment also includes the detectors 10 and 20, the starter 30, the engine 40, the display device 50, the storage battery 60, the control devices 100 and 200, and the eco-run control device 900. Only the functional configuration of the eco-run control device 900 in the second embodiment is different from that of the eco-run control device 900 in the first embodiment. Accordingly, the same reference numerals and signs are given to the corresponding parts and overlapping description between these embodiments will be omitted.

In the second embodiment, the eco-run control device 900 includes a starter driving circuit 920 in addition to the microcomputer 910. The starter driving circuit 920 controlled by the microcomputer 910 is configured to restart the engine 40. Specifically, the starter driving circuit 920 drives the starter 30 for restarting the engine 40 when the microcomputer 910 outputs an engine driving command.

The microcomputer 910 controls the starter driving circuit 920. The microcomputer 910 also has a testing function for the starter driving circuit 920. That is, the microcomputer 910 tests whether the starter driving unit is out of order before stopping the engine 40 by the eco-run control. If failure is detected on the basis of the test result, the microcomputer 910 prohibits the execution of the eco-run control. This is to prevent the eco-run control device 900 from being unable to restart the engine 40 after the idling stop due to the failure of the starter driving circuit 920.

Figure 8:
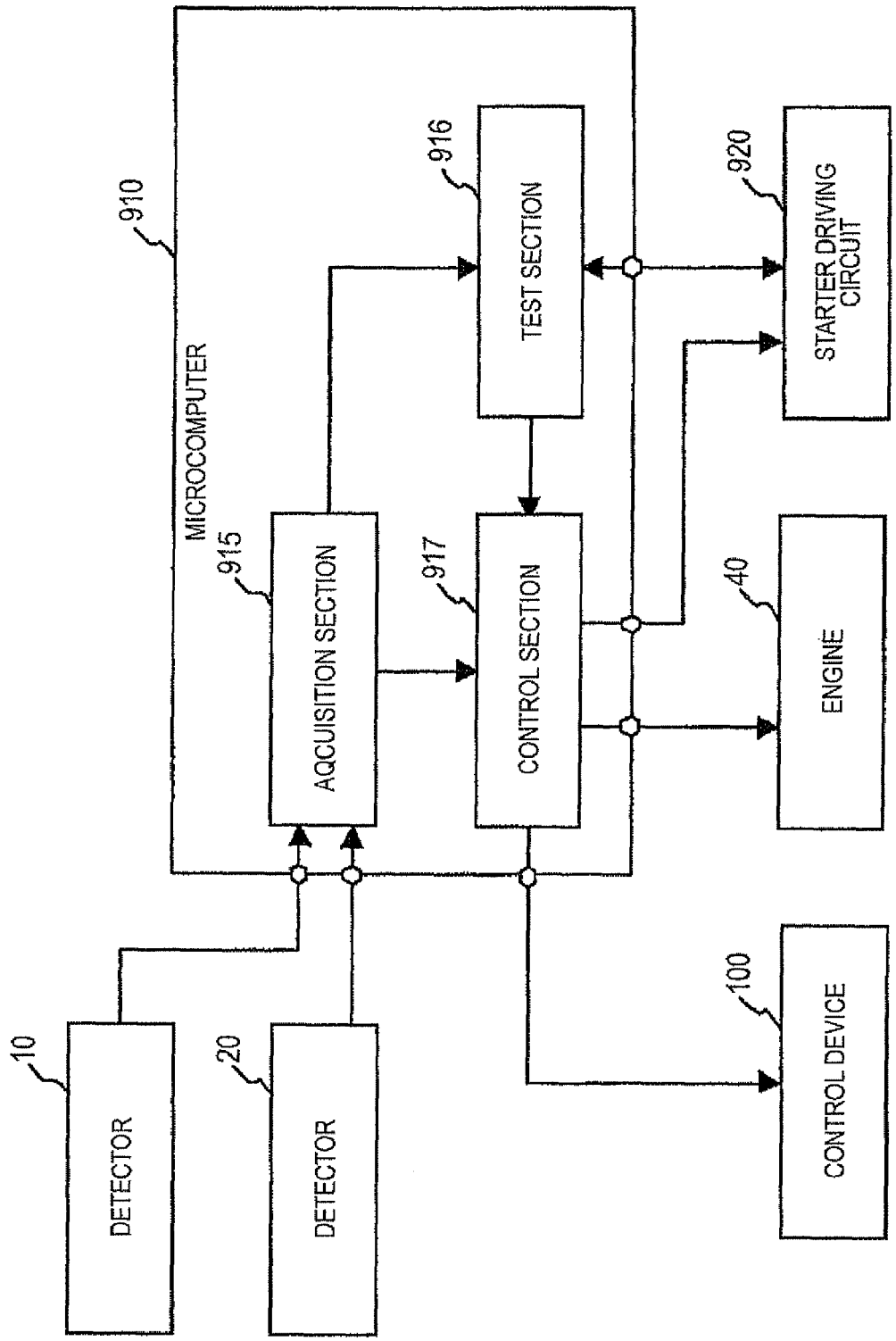
FIG. 8 is a functional block diagrams illustrating the configuration of a microcomputer according to the second embodiment.

As shown in FIG. 8, the microcomputer 910 in the second embodiment includes an acquisition section 915, a test section 916, and a control section 917. Although the microcomputer 910 in the second embodiment may include the acquisition section 911, the determination section 912, the control setting section 913 and the first control section 914, these sections included in the microcomputer 910 are not shown in FIG. 8. The acquisition section 921 is realized by executing acquisition processing using the execution section 910b. The acquisition section 915 acquires signals output from the detectors 10 and 20. Specifically, the acquisition section 915 acquires a signal for determining whether or not the engine stop conditions and the engine restart conditions are satisfied. More specifically, the acquisition section 915 acquires a signal indicating the temperature and the like and a signal indicating the voltage and the like as described in the first embodiment. In addition, the acquisition section 915 may be configured to acquire a signal, which is output from the starter driving circuit 920 to the starter 30, in order to monitor a voltage (that is, a monitor voltage) applied to the starter 30 through the starter driving circuit 920. Since both the acquisition section 915 in the second embodiment and the acquisition section 911 in the first embodiment are realized by the execution section 910b, these sections can be integrated.

The test section 916 is realized by executing test processing using the execution section 910b. The test section 916 tests whether the starter driving circuit 920 is out of order and outputs the test result to the control section 917. Specifically, the test section 916 tests an operation of the starter driving circuit 920 to detect the failure of the starter driving circuit 920 before the engine 40 is stopped by eco-run control. More specifically, the test section 916 tests the operation of the starter driving circuit 920 according to the test pattern provided by (transmitted from) the control section 917. The test section 916 provides a conducting pattern, which makes an internal circuit of the starter driving circuit 920 operate but a current does not flow through the starter 30, to the internal circuit of the starter driving circuit 910 which controls the supply of electric power to the starter 30. The test section 916 detects failure of the starter driving circuit 920 if a monitor voltage increases up to a predetermined value when a pattern other than the conducting pattern is executed. Moreover, regarding a pattern for actually driving the starter 30, the test section 916 performs failure detection by executing the pattern when control of driving the starter 30 is actually performed to start up the engine 40, so that the starter 30 is not started up at the time of testing by execution of the pattern.

The control section 917 is realized by executing control processing using the execution section 910b. The control section 917 executes the eco-run control on the basis of the signal acquired by the acquisition section 915 and the test result obtained by testing the starter driving circuit 920 using the test section 916.

Specifically, the control section 917 determines whether or not test conditions are satisfied on the basis of a signal acquired by the acquisition section 915. Here, the test conditions include a condition of "before automatically stopping the engine 40 by the eco-run control". The test conditions include a condition in which a vehicle does not stop and the failure of the starter driving circuit 920 is not detected. As a specific example, the control section 917 determines whether or not the test conditions are satisfied on the basis of a vehicle speed and the number of revolutions of the engine 40 which are indicated by signals acquired by the acquisition section 915. When the control section 917 determines that the test conditions are satisfied, the control section 917 provides (transmits) the test pattern which is preliminary stored to the test section 916.

The control section 917 then determines whether or not the test section 916 completes testing the failure of the starter driving circuit 920. The control section 917 prohibits the execution of the eco-run control until the completion of the test by the test section 916. Specifically, the control section 917 prohibits the first control section 914 described in the first embodiment from stopping the engine automatically by the eco-run control until the test by the test section 916 is completed. Even though the eco-run control device 900 permits the execution of the eco-run control (i.e. permits the first control section 914 to automatically stop the engine 40 when the stop conditions are satisfied) until the determination section 912 decides the type of the vehicle (see, FIGS. 2A-2F) in the first embodiment, the control section 917 prohibits the execution of the eco-run control until the completion of the test. In other words, the eco-run control is prohibited until the test by the test section 916 is completed even after the type of the vehicle is decided by the determination section 912.

If the control section 917 determines that the failure test of the starter driving circuit 920 is completed, the control section permits or prohibits the execution of the eco-run control on the basis of a result of the failure test. That is, in a case where the test section 916 does not detect the failure of the starter driving circuit 920 during the failure test, the control section 917 permits the first control section 914 to stop the engine automatically by the eco-run control when the stop conditions are satisfied. In a case where the test section 916 detects the failure of the starter driving circuit 920 during the failure test (i.e. in a case where the test section 916 determines that the starter driving circuit 920 is out of order), the control section 917 prohibits the first control section 914 from stopping the engine automatically by the eco-run control even when the stop conditions are satisfied.

In the second embodiment, the test section 916 of the microcomputer 910 tests whether the starter driving circuit 920 is out of order before stopping the engine 40 by the eco-run control. The present invention is not limited to this specific configuration. The test section 916 of the microcomputer 910 may test whether the vehicle is out of order before the engine 40 is stopped automatically by the eco-run control. Specifically, the test section 916 of the microcomputer 910 may be configured to test the other items which should be tested before the first control section 914 automatically stops the engine by the eco-run control. For example, the test section 916 may determine whether the engine can be restarted from the idling stop state by testing battery-related components, starter-related components, or various sensors-related components such as a sensor of a neutral switch and a sensor of a clutch switch, which are used for determining whether the restart conditions are satisfied. The test section 916 may determine whether an adequate braking force can be secured during the idling stop state by testing brake booster-related components. In this case, the control section 917 of the microcomputer permits the first control section 914 to stop the engine automatically by the eco-run control when the test section 916 does not detect the failure of the vehicle (does not detect that the vehicle is out of order) during the failure test and prohibits the first control section 914 from stopping the engine automatically by the eco-run control when the test section 916 detects the failure of the vehicle (detects that the vehicle is out of order) during the failure test even if the stop conditions are satisfied. The control section 917 determines whether the failure test of the test section 916 is completed and prohibits the first control section 914 from stopping the engine automatically by the eco-run control until the test section 916 completes the failure test.

While the preferred embodiments of the invention have been described in detail, it should be understood that the invention is not limited to those specific embodiments but various changes and modifications thereof could be made without departing from the spirit and scope of the invention as defined in the appended claims.

What is claimed is:

1. An eco-run control device configured to perform an eco-run control of stopping an engine mounted on a vehicle automatically on the basis of stop conditions and of restarting the engine automatically on the basis of restart conditions while the engine is stopped automatically by the eco-run control, the eco-run control device comprising:
   an eco-run control unit configured to perform the eco-run control;
   an acquiring unit configured to acquire information for identifying a vehicle type of the vehicle on which the eco-run control device is mounted;
   a determining unit configured to determine whether the vehicle type identified by the information acquired by the acquiring unit is coincident with any of a plurality of vehicle types stored in a storage unit; and
   a setting unit configured to set the eco-run control to be performed by the eco-run control unit to a specific control depending on one of the vehicle types when the determining unit determines that the identified vehicle type is coincident with the one of the stored vehicle types,
   wherein the setting unit sets the eco-run control to be performed by the eco-run control unit to a default control corresponding to a default vehicle type and permit the eco-run control unit to stop the engine automatically until a determination of the determination unit is completed, and
   wherein the setting unit prohibits the eco-run control unit from stopping the engine automatically when the determining unit determines that the identified vehicle type is different from any of the stored vehicle types.

2. The eco-run control device as set forth in claim 1,
   wherein the vehicle type includes a place where the vehicle is intended to be used and the restart conditions vary depending on the place,
   wherein the acquiring unit acquires information for identifying the place,
   wherein the determining unit determines whether the place identified by the information acquired by the acquiring unit is coincident with any of a plurality of places stored in the storage unit, and
   wherein the setting unit controls the eco-run control unit to restart the engine and then prohibits the eco-run control unit from stopping the engine automatically when the determining unit determines that the identified place is different from any of the stored places during the engine is stopped automatically by the eco-run control.

3. The eco-run control device as set forth in claim 2,
   wherein the vehicle type includes a type of the engine mounted on the vehicle and the stop conditions vary depending on the type of the engine,
   wherein the acquiring unit acquires information for identifying the type of the engine,
   wherein the determining unit determines whether the type of the engine identified by the information acquired by the acquiring unit is coincident with any of a plurality of types of the engine, stored in the storage unit, and
   wherein the setting unit prohibits the eco-run control unit to from stopping the engine automatically when the determining unit determines that the identified type of the engine is different from any of the stored types of engine at least one of before the engine is stopped automatically by the eco-run control and after the engine is restarted by the eco-run control.

4. The eco-run control device as set forth in claim 3,
   wherein the determining unit determines whether the identified place is coincident with any of stored places by comparing the identified place with the stored places first multiple times, and
   wherein the determining unit determines whether the identified type of the engine is coincident with any of the stored types of the engine by comparing the identified type of the engine with the stored types of the engine second multiple times.

5. The eco-run control device as set forth in claim 4, wherein the first multiple times are more than the second multiple times.

6. The eco-run control device as set forth in claim 1, further comprising:
- a test unit configured to test whether the vehicle is out of order before the engine is stopped automatically by the eco-run control; and
- a prohibiting unit configured to prohibit the eco-run control unit from stopping the engine automatically when the test unit determines that the vehicle is out of order,
- wherein the prohibiting unit determines whether a test of the test unit is completed and prohibits the eco-run control unit from stopping the engine automatically until the test of the test unit is completed.

7. The eco-run control device as set forth in claim 6, further comprising:
- a starter driving unit configured to drive a starter for restarting the engine,
- wherein the test unit is configured to test whether the starter driving unit is out of order before the engine is stopped automatically by the eco-run control, and
- wherein the prohibiting unit is configured to prohibit the eco-run control unit from stopping the engine automatically when the test unit determines that the vehicle is out of order.

8. An eco-run control method for performing an eco-run control of stopping an engine mounted on a vehicle automatically on the basis of stop conditions and of restarting the engine automatically on the basis of restart conditions while the engine is stopped automatically by the eco-run control, the eco-run control method comprising:
- performing the eco-run control;
- acquiring information for identifying a vehicle type of the vehicle on which the eco-run control device is mounted;
- determining whether the vehicle type identified by the acquired information is coincident with any of a plurality of vehicle types stored in a storage unit;
- setting the eco-run control to be performed to a default control corresponding to a default vehicle type and permitting to stop the engine automatically in the performing until the determining is completed;
- setting the eco-run control to be performed to a specific control depending on one of the vehicle types when it is determined that the identified vehicle type is coincident with the one of the stored vehicle types in the determining; and
- prohibiting stopping the engine automatically in the performing when it is determined that the identified vehicle type is different from any of the stored vehicle types in the determining.

* * * * *